(12) United States Patent
Secher et al.

(10) Patent No.: US 10,765,267 B2
(45) Date of Patent: Sep. 8, 2020

(54) SHOWER INSTALLATION KIT AND METHOD OF INSTALLING SHOWER

(71) Applicant: UNIDRAIN A/S CORPORATION, Farum (DK)

(72) Inventors: Peter Secher, Odense (DK); Jacob Honoré, Hellebaek (DK)

(73) Assignee: UNIDRAIN A/S (DK)

( * ) Notice: Subject to any disclaimer, the term of this patent is extended or adjusted under 35 U.S.C. 154(b) by 509 days.

(21) Appl. No.: 14/654,386

(22) PCT Filed: Dec. 17, 2013

(86) PCT No.: PCT/EP2013/076907
§ 371 (c)(1),
(2) Date: Jun. 19, 2015

(87) PCT Pub. No.: WO2014/095868
PCT Pub. Date: Jun. 26, 2014

(65) Prior Publication Data
US 2015/0342420 A1    Dec. 3, 2015

(30) Foreign Application Priority Data

Dec. 21, 2012  (DK) .................................. 2012 70820

(51) Int. Cl.
*A47K 3/40*   (2006.01)
*E03F 5/04*   (2006.01)
*A47K 3/30*   (2006.01)

(52) U.S. Cl.
CPC ................. *A47K 3/40* (2013.01); *A47K 3/30* (2013.01); *A47K 3/405* (2013.01); *E03F 5/04* (2013.01);
(Continued)

(58) Field of Classification Search
CPC .. A47K 3/30; A47K 3/40; A47K 3/405; E03F 5/04; E03F 5/0408
(Continued)

(56) References Cited

U.S. PATENT DOCUMENTS

| 5,493,738 A | 2/1996 | Sanderson et al. |
| 6,792,721 B1 * | 9/2004 | Montanari ............... A47K 3/36 4/612 |

(Continued)

FOREIGN PATENT DOCUMENTS

| CH | 701285 | 12/2010 |
| DE | 202004008885 | 11/2005 |

(Continued)

OTHER PUBLICATIONS

DE102011119697_Translation.*
(Continued)

*Primary Examiner* — Tuan N Nguyen
(74) *Attorney, Agent, or Firm* — Lerner, David, Littenberg, Krumholz & Mentlik, LLP

(57) ABSTRACT

The shower installation kit includes an elongated drain adapted to be arranged at an inclined shower floor and at least one elongated side member adapted to be arranged at right angles to the elongated drain and at a side of the inclined shower floor. Each elongated side member has a longitudinal flange adapted to define a slope of the inclined shower floor and adapted to be positioned under a floor covering of the inclined shower floor. The drain is adapted to be mounted at a distance from a subfloor structure of the inclined shower floor before installation of the inclined shower floor. The drain is provided with a front flange adapted to be positioned under the floor covering, and the (Continued)

longitudinal flange of the at least one side member is connected to and arranged flush with the front flange of the drain.

20 Claims, 21 Drawing Sheets

(52) U.S. Cl.
CPC .............. *E03F 5/0408* (2013.01); *Y02A 30/68* (2018.01); *Y10T 29/49828* (2015.01)

(58) Field of Classification Search
USPC .............................................. 4/613
See application file for complete search history.

(56) References Cited

U.S. PATENT DOCUMENTS

| | | | | |
|---|---|---|---|---|
| 7,225,480 | B2 * | 6/2007 | Mascheroni | A47K 3/30 |
| | | | | 4/612 |
| 7,246,472 | B2 * | 7/2007 | Nielsen | E03F 5/0406 |
| | | | | 4/301 |
| 8,505,131 | B2 * | 8/2013 | Doolittle | E03F 5/0408 |
| | | | | 4/613 |
| 2010/0162481 | A1 * | 7/2010 | Erlebach | E03F 5/04 |
| | | | | 4/613 |
| 2011/0047695 | A1 | 3/2011 | Niedens | |
| 2012/0110827 | A1 | 5/2012 | Doolittle et al. | |

FOREIGN PATENT DOCUMENTS

| | | | | |
|---|---|---|---|---|
| DE | 102005061131 | | 7/2007 | |
| DE | 102006000893 | | 7/2007 | |
| DE | 202006019995 | | 8/2007 | |
| DE | 202007015355 | U1 * | 3/2008 | ............... A47K 3/40 |
| DE | 202008003050 | U1 * | 7/2008 | ............... A47K 3/40 |
| DE | 202008003050 | | 8/2008 | |
| DE | 202005021587 | | 11/2008 | |
| DE | 102009003389 | A1 | 8/2009 | |
| DE | 202011051047 | U1 | 11/2012 | |
| DE | 202011051047 | U1 * | 11/2012 | ............. E03F 5/0408 |
| DE | 102011119697 | A1 * | 5/2013 | ............. A47K 3/405 |
| EP | 1212969 | | 6/2002 | |
| EP | 2353482 | | 8/2011 | |
| WO | 200024303 | | 5/2000 | |
| WO | 200173231 | | 10/2001 | |
| WO | 2007071371 | | 6/2007 | |

OTHER PUBLICATIONS

DE-202008003050-U1 Translation (Year: 2008).*
DE-202011051047-U1 Translation (Year: 2012).*
DE-202007015355-U1 Translation (Year: 2008).*
International Preliminary Report on Patentability for PCT/EP2013/076907, dated Feb. 13, 2014, 8 pages.
International Search Report from PCT/EP2013/076907, dated Feb. 25, 2014, 3 pages.

* cited by examiner

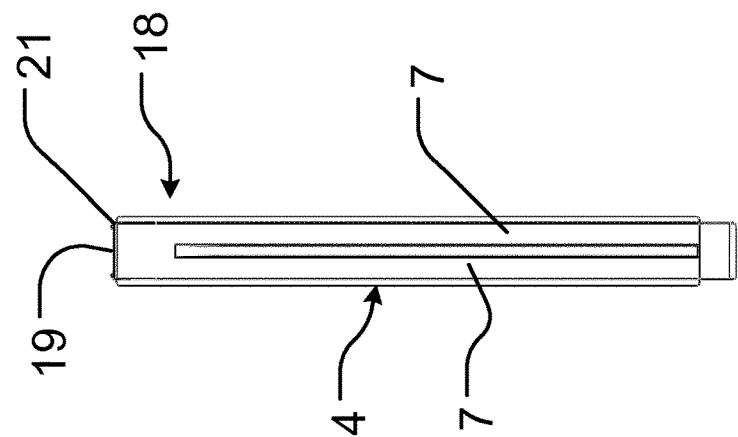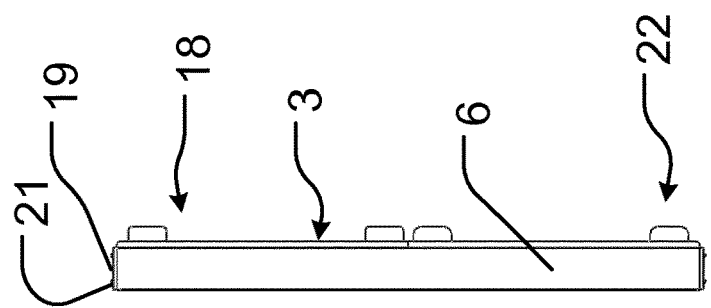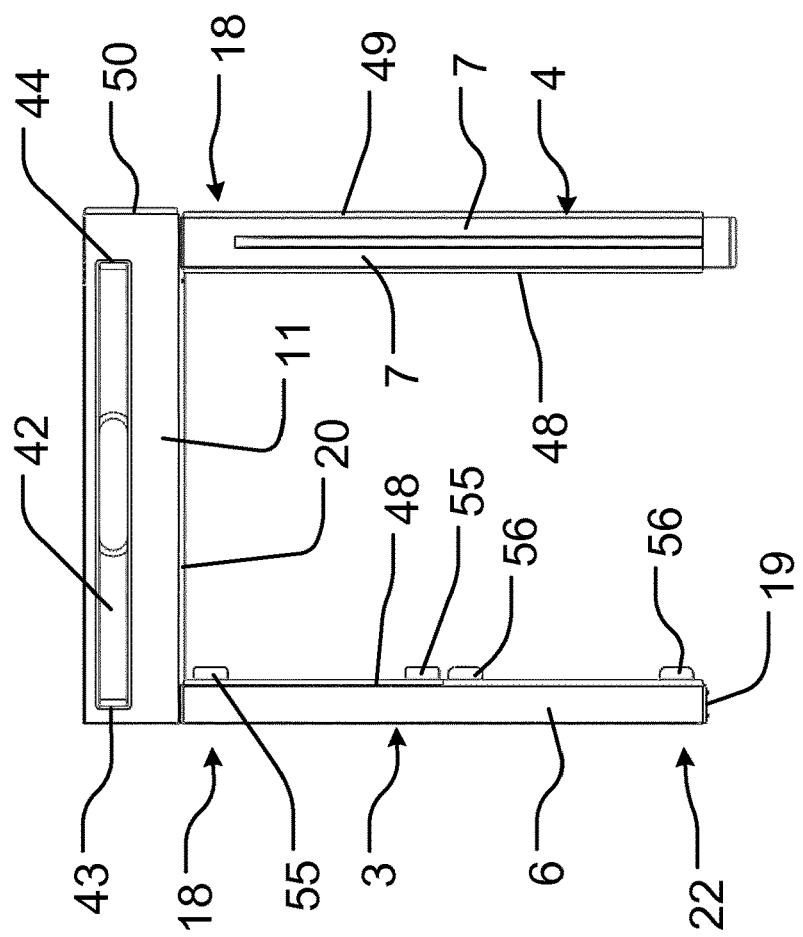

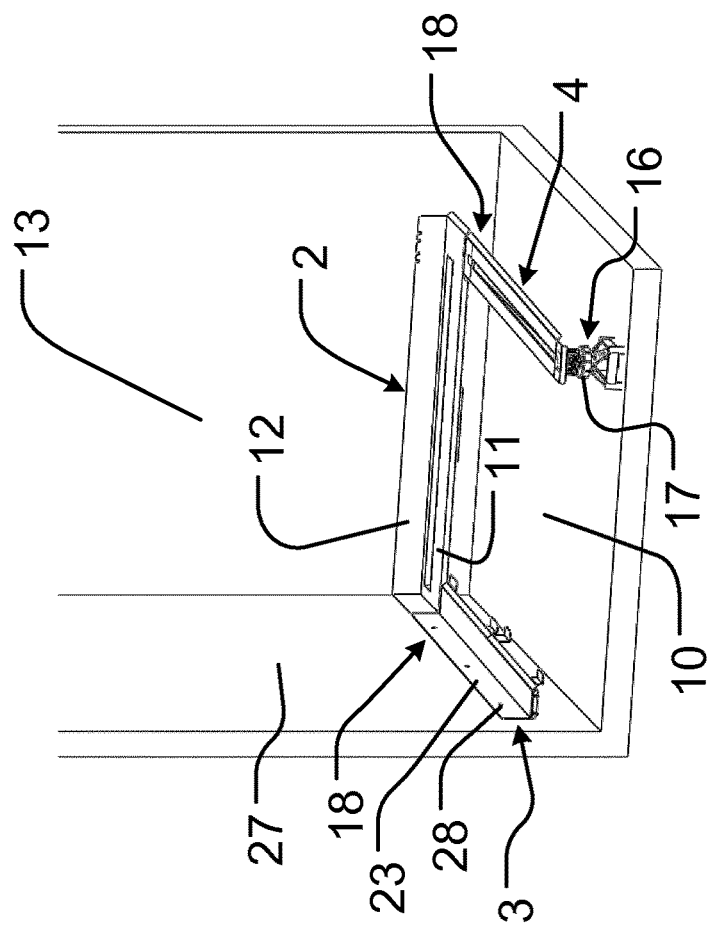
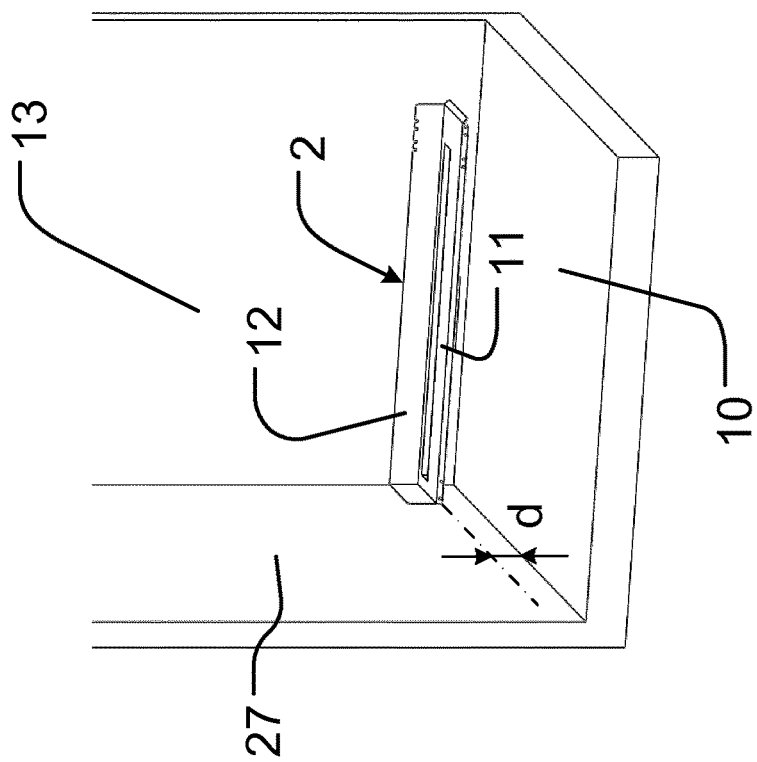
Fig. 6
Fig. 5

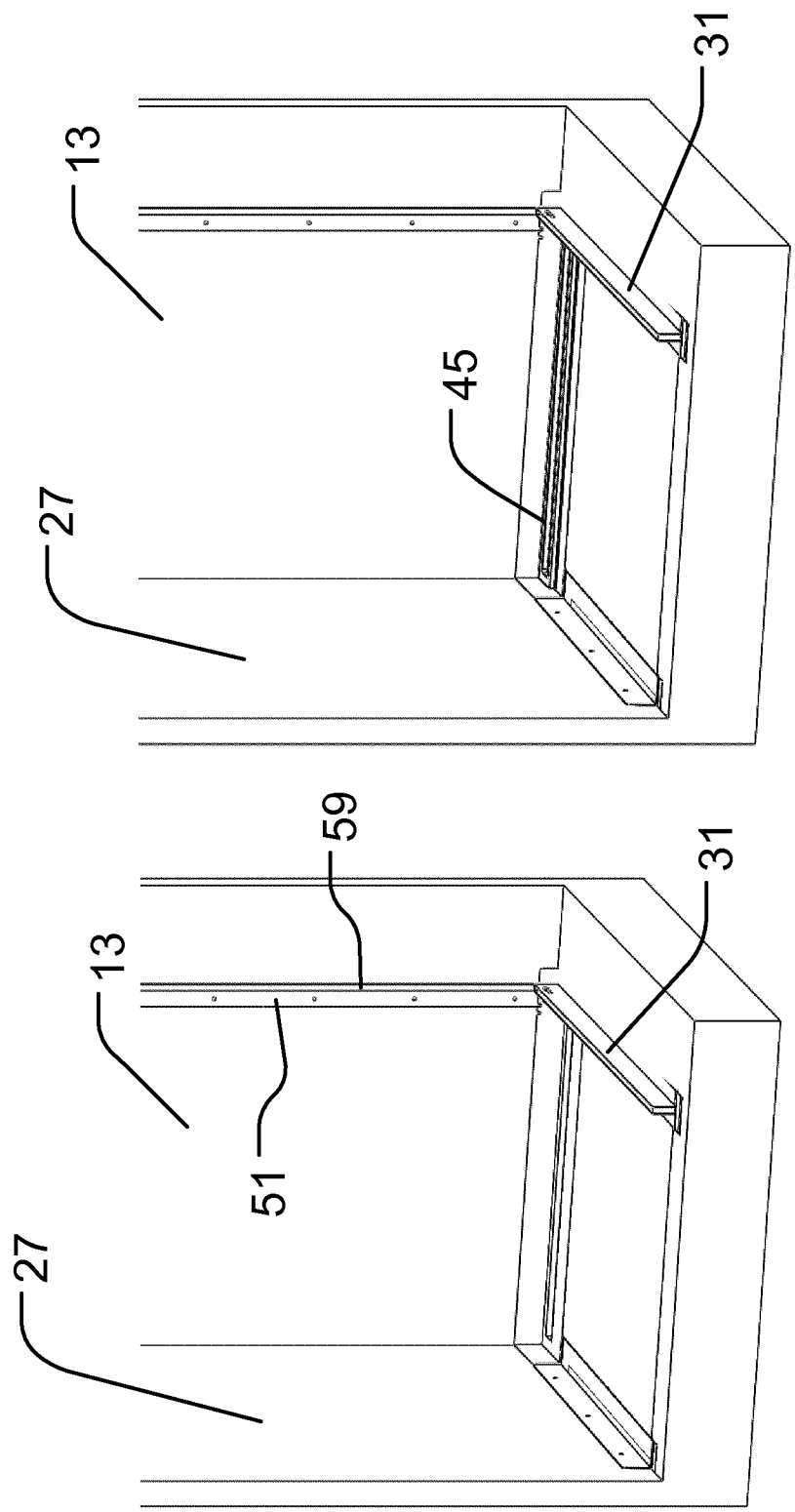

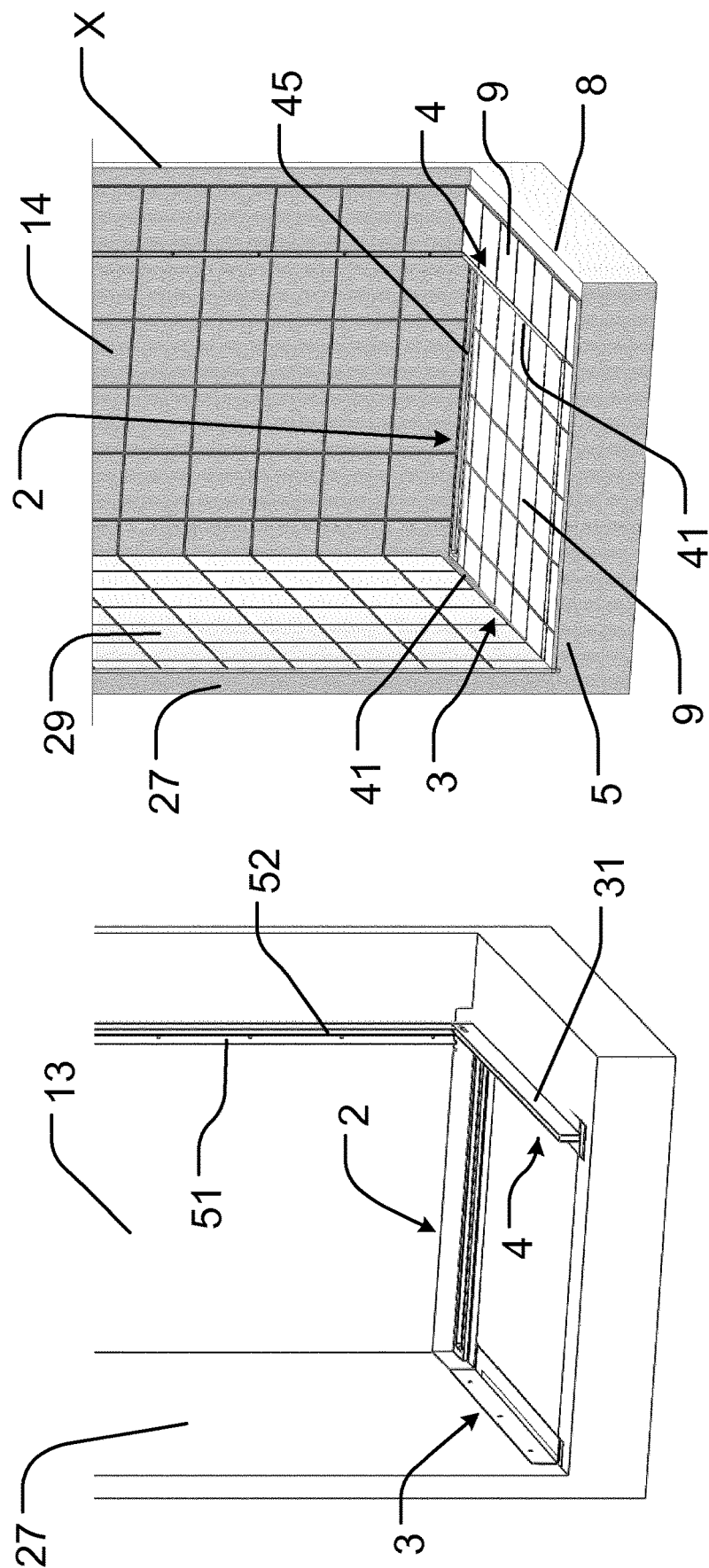

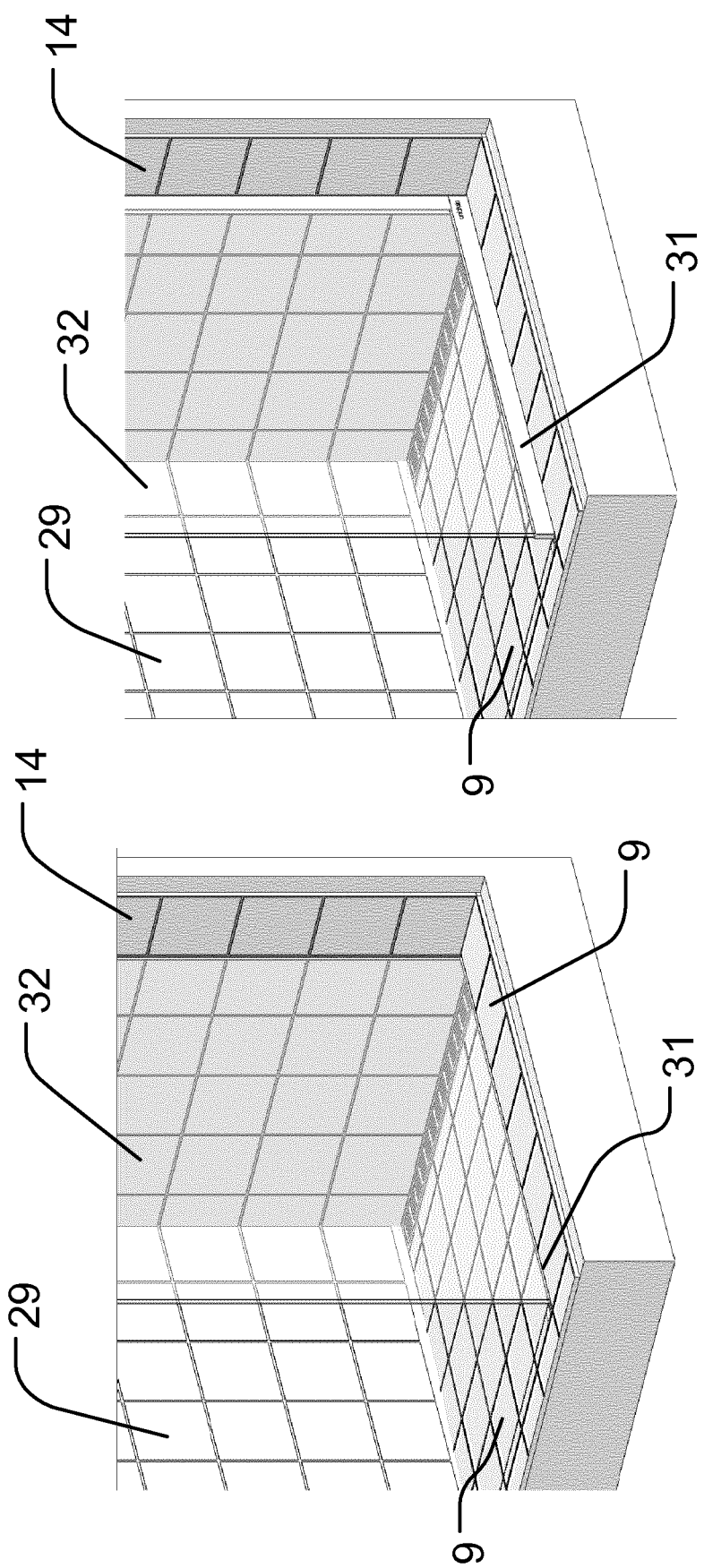

SHOWER INSTALLATION KIT AND METHOD OF INSTALLING SHOWER

CROSS-REFERENCE TO PRIOR APPLICATION

This is the U.S. National Phase Application under 35 U.S.C. § 371 of International Patent Application No. PCT/EP2013/076907 filed Dec. 17, 2013, which claims the benefit of Danish Patent Application No. PA 201270820 having a priority date of Dec. 21, 2012, both of which are incorporated by reference herein. The International Application was published in English on Jun. 26, 2014 as WO2014/095868 A1 under PCT article 21(2).

The present invention relates to a shower installation kit including an elongated drain having a longitudinal direction and being adapted to be arranged at an inclined shower floor, the elongated drain being adapted to be mounted at a distance from a subfloor structure of the inclined shower floor before installation of the inclined shower floor, and the elongated drain being provided with a front flange adapted to be positioned under the floor covering of the inclined shower floor.

CH 701 285 B1 describes the installation of a so-called barrier-free shower, whereby, before the installation of the shower, a subfloor is so grouted that an inclination is formed from a front edge to a back wall. Subsequently, a left and a right tapered elongate profile element are arranged in parallel in the transition zone between the surrounding horizontal floor and the inclined shower floor. The profile elements have a flange adapted to be arranged below the floor covering of the surrounding horizontal floor and a vertical wedge-formed wall part covering the wedge-formed step of the subfloor between the surrounding horizontal floor and the inclined shower floor. The profile elements may further have a flange adapted to be arranged below the floor covering of the inclined shower floor. However, it may be troublesome even for an experienced person to grout the inclined subfloor and especially to grout the transition between the inclined subfloor and the surrounding horizontal subfloor prior to mounting the profile elements.

EP 2 353 482 A2 likewise discloses a decorative strip for a so-called barrier-free shower. The decorative strip is height adjustable in order to cover wedge-formed transition zones of differing size formed between an inclined shower floor and a surrounding horizontal floor. The decorative strip has a holding profile, in which a decorative strip profile is received displaceably for adjusting the height of the visible decorative surface. The holding profile has a U-shaped cross-sectional area for receiving the decorative strip profile. The decorative strip profile may itself be provided with an upwardly open U-shaped cross-sectional area intended for the insertion of the lower edge of a partition wall. However, before installing the decorative strip disclosed, the inclined shower subfloor as well as the surrounding horizontal subfloor has to be grouted. As mentioned above, it may be troublesome even for an experienced person to grout the inclined subfloor and especially to grout the transition between the inclined subfloor and the surrounding horizontal subfloor.

EP 1 287 213 B9 (Unidrain A/S) discloses an elongated floor drain and a method of installing such a drain in a building structure. The floor drain is at first fixed to a brick or plaster board wall by means of a vertical back flange of the drain that is fastened to the wall by means of screws, and a discharge pipe is connected. Insulating bats with upper plywood boards are then laid out, a concrete base is cast, and a concrete levelling layer with a unidirectional slope is then laid using the location of the drain as a guide for establishing the proper slope of the levelling layer. The walls, the floor and the flange part of the drain are finally tiled and the floor drain is covered with a grating. Although the location of the drain may be used as a guide for the position of the rearmost part of the sloping levelling layer, it may still be troublesome even for an experienced person to grout the inclined subfloor correctly and especially to grout the transition between the inclined subfloor and the surrounding horizontal subfloor.

DE 20 2011 051 047 U1 discloses a drain assembly comprising an elongated drain with a wall flange for mounting the drain to a wall and a horizontal flange to be covered by tiles. The drain is provided with feet to support the drain on a subfloor.

The object of the present invention is to facilitate the installation of a shower. In view of this object, the shower installation kit includes at least one elongated side member having a longitudinal direction and being adapted to be arranged with its longitudinal direction at right angles to the longitudinal direction of the elongated drain and at a side of the inclined shower floor, the at least one elongated side member has a longitudinal flange adapted to define a slope of the inclined shower floor in relation to a horizontal room floor at least partially surrounding the inclined shower floor, the longitudinal flange of the at least one elongated side member is adapted to be positioned under a floor covering of the inclined shower floor, and the longitudinal flange of the at least one side member is connected to and arranged flush with the front flange of the elongated drain.

In this way, the longitudinal flange of the at least one side member may be fixed in a correctly sloping position in relation to the subfloor structure before grouting the inclined shower floor and may therefore serve as guide at one or both sides of the shower floor when establishing the proper inclination of the shower floor by means of grouting a levelling layer. Therefore, the position of the inclined shower floor may be predefined and the craftsman may simply adapt the shower floor to follow the longitudinal flange of the at least one side member without the need to proceed by rule of thumb, which has otherwise been the usual practice until now.

In an embodiment, the elongated drain has two elongated side members adapted to be arranged at opposed sides of the inclined shower floor. Thereby, the position of the inclined shower floor may be completely predefined and the craftsman may simply adapt the shower floor to follow the longitudinal flanges of the two opposed side members.

In an embodiment, at least one of the at least one side members is provided with a support member adapted to support said side member against a subfloor structure before installation of the inclined shower floor, the support member being positioned at a distance from the front flange of the elongated drain and preferably at the opposite end of said side member in relation to the front flange of the elongated drain. Thereby, proper positioning of the at least one side member may be further ensured in that the side members may be supported along their length supplementary to the support provided by the connection to the front flange of the elongated drain.

The support member of at least one of the side members is preferably height adjustable. Thereby, proper positioning of the side members may be facilitated in that the side members may easily be supported in a correctly adjusted position along their length supplementary to the support provided by the connection to the front flange of the elongated drain. Consequently, there is no need for blocks or wedges in order to position the side members correctly.

In an embodiment, each elongated side member is provided as a separate element having a first end with a first connector adapted for connection to a front edge of the front flange of the elongated drain. Thereby, the elongated side members may be applied together with a standard elongated drain. Consequently, the elongated drain does not have to be specially adapted, apart from possibly drilling some connection holes for screws or the like.

In a structurally advantageous embodiment, the connector has the form of an inclined edge face adapted to abut a corresponding inclined edge face of the front flange of the elongated drain, said edge faces being inclined to a top surface plane of the front flange of the elongated drain and being provided with holes for connection bolts, screws or similar connection means.

In an embodiment, the separate element of at least one of the at least one elongated side member has a second end with a second connector corresponding to the first connector. Thereby, for instance, a member being provided with a vertical mounting flange for wall mounting may be mounted at either side of a shower, according to requirements, by simply flipping over the member in relation to the elongated drain.

The second connector is preferably connected to a corresponding connector of a, preferably height adjustable, support member adapted to support said side member against a subfloor structure before installation of the inclined shower floor. Thereby, such support member may be applied according to requirements.

In an embodiment, at least one of the at least one elongated side members is integrated with the front flange of the elongated drain by being welded, soldered or otherwise fixedly connected thereto or by being manufactured from one piece of material, such as sheet metal. Thereby, installation of the shower may be further facilitated in that the at least one elongated side member is positioned and supported together with the elongated drain so that no separate mounting or adjustment of the elongated side members is needed. Furthermore, a more precise positioning of the elongated side members may be possible, because these may be positioned correctly and precisely during manufacturing of the elongated drain.

In an embodiment, two elongated side members positioned at opposed sides of the inclined shower floor are provided with a connecting, bridge-like, member connected to each of said elongated side members at the end of said side members opposed to the end at the front flange of the elongated drain. Thereby, the elongated side members may further be stabilized in relation to each other, thereby further ensuring precise positioning of these before and during installation of the inclined shower floor.

The connecting, bridge-like, member is preferably detachably connected to each of said elongated side members at the end of said side members opposed to the end at the front flange of the elongated drain. Thereby, mounting of the elongated drain, for instance to a wall by means of screws, may be facilitated by removing the connecting, bridge-like, member during mounting, whereby access to the drain may be facilitated.

In an embodiment, at least one of the at least one elongated side members includes a vertical mounting flange adapted to be mounted flat on a vertical side wall, preferably by means of screws, nails or the like fastening means, and to be positioned under a vertically extending wall covering of the side wall. Thereby, an end of the elongated drain may be mounted very close to or even abutting an existing wall of a building.

In an embodiment, each elongated side member includes a transition face adapted to extend vertically and define a wedge-formed transition between a surface plane of the inclined shower floor and a surface plane of the horizontal room floor, the elongated drain includes a longitudinal drain opening arranged along the front flange of the elongated drain and having a first end and a second end, and, preferably, the transition face of a respective elongated side member is located at a position less than about 5 centimetres, preferably less than about 3 centimetres, and most preferred less than about 2 centimetres, from the nearest end of the longitudinal drain opening measured in the longitudinal direction of the elongated drain. Thereby, it may be obtained that a standard grate, including any surrounding frame associated therewith, mounted over the longitudinal drain opening, extends very closely up to or even abuts said wedge-formed transition and thereby visually extends along the full width of the inclined shower floor and possibly extends at least very closely up to an existing wall of a building or a partition wall at the side of the shower floor.

In an embodiment, the longitudinal drain opening is provided with a corresponding elongated grate, preferably including a surrounding frame associated with the grate, having a first end and a second end, and the transition face of each elongated side member abuts or is positioned nearer than about 7 millimetres, preferably nearer than about 5 millimetres, and most preferred nearer than about 3 millimetres, from a corresponding one of the first and second ends of the elongated grate including any surrounding frame associated with the grate. Thereby, it may be obtained that the grate including any surrounding frame associated with the grate visually extends along the full width of the inclined shower floor and possibly extends at least very closely up to an existing wall of a building or a partition wall at the side of the shower floor.

In an embodiment, the longitudinal flange of each elongated side member has an inner edge facing the centre of the inclined shower floor, said inner edges are positioned between the first and second ends of the longitudinal drain opening measured in the longitudinal direction of the elongated drain. Thereby, a suitably broad longitudinal flange in terms of stability of the connection between the elongated side member and the shower floor may be obtained and at the same time it may be obtained that a standard grate, including any surrounding frame associated therewith, mounted over the longitudinal drain opening extends very closely up to or even abuts said wedge-formed transition and thereby visually extends along the full width of the inclined shower floor and possibly extends at least very closely up to an existing wall of a building or a partition wall at the side of the shower floor.

The longitudinal flange of at least one of the elongated side members has preferably an outer edge facing away from the centre of the inclined shower floor and being arranged in continuation of or flush with an end edge of the front flange of the elongated drain. Thereby, it may be ensured that a smooth transition also between the outer edge of the longitudinal flange of the elongated side members and a standard elongated drain is obtained, so that flush connection between flanges, a membrane and floor covering may be obtained.

In an embodiment, the longitudinal flange of at least one of the elongated side members has an upwardly open groove extending in the longitudinal direction of the elongated side member and having decreasing depth in the direction towards the elongated drain. Thereby, a partition wall for the shower may be inserted into the upwardly open groove so that the partition wall is arranged horizontally although the longitudinal flange is inclined towards the elongated drain. In this case, part of the partition wall may form the above-mentioned transition face adapted to extend vertically and define a wedge-formed transition between a surface plane of the inclined shower floor and a surface plane of the horizontal room floor.

Preferably, a U-formed rail having a constant cross-section along its length is inserted into the upwardly open groove so that a lower edge of a partition wall for the shower may be inserted into the U-formed rail. Thereby, the lower edge of the partition wall may be protected by the U-formed rail, which may be an advantage for instance in the case that the partition wall is made of glass. Furthermore, it may be an aesthetic advantage that for instance a glass wall may extend at a distance from the floor covering. In this case, at least part of a side flange of the U-formed rail may form the above-mentioned transition face adapted to extend vertically and define a wedge-formed transition between a surface plane of the inclined shower floor and a surface plane of the horizontal room floor.

In an embodiment, the elongated drain is provided with a back flange arranged oppositely to its front flange and adapted to be positioned under a vertically extending wall covering, and the U-formed rail extends up to the area of or abuts the back flange of the elongated drain. Thereby, a partition wall may be supported by the U-formed rail up to the area of a back wall of the shower, although the upwardly open groove of the longitudinal flange may end at a distance from said back wall.

Preferably, a bottom flange of the U-formed rail extends above a top surface plane of the front flange of the elongated drain. Thereby, a standard elongated drain may be utilized without the need for specifically adapting the elongated drain, which otherwise could be done, for instance, by forming a part of the above-mentioned upwardly open groove in the front flange of the elongated drain.

In an embodiment, the upwardly open groove of the longitudinal flange of at least one of the elongated side members is defined by two opposed wall members, of which a first wall member stops before reaching a line through a front edge of the front flange of the elongated drain, and of which a second wall member extends up to the area of or abuts the back flange of the elongated drain. Thereby, a standard elongated drain may be utilized without the need for specifically adapting the elongated drain. Furthermore, the second wall member extending to the back flange of the elongated drain may provide additional support for the U-formed rail in order to better support the partition wall.

The second wall member is preferably connected by a bend to a raised longitudinal flange of the respective elongated side member, said raised longitudinal flange being adapted to be positioned under a floor covering of the horizontal room floor. Thereby, the elongated side member may be even better stabilized to provide support for the partition wall and also may better seal the transition zone between the surrounding horizontal floor and the inclined shower floor against water.

In an embodiment, the kit includes a longitudinal wall flange having a longitudinal direction and adapted to be arranged with its longitudinal direction vertically and to be positioned under a vertically extending wall covering of a back wall, the longitudinal wall flange is provided with a U-formed rail mountable along a centre line of the longitudinal wall flange in order to extend through or at least be accessible through the vertically extending wall covering for insertion of an edge of a partition wall for the shower into the U-formed rail. Thereby, mounting of a partition wall is facilitated in that fixation along a vertical edge of the wall may be integrated with the wall covering of the back wall.

Preferably, a lower end of the longitudinal wall flange is provided with an engagement part fitting a corresponding engagement part of a back flange of the elongated drain. Thereby, correct positioning of the longitudinal wall flange may be facilitated.

The present invention further relates to a shower including a shower installation kit as described above, wherein, before installation of the inclined shower floor, the elongated drain has been fixed to a wall and each one of the two elongated side members has been connected at a first one of its ends to the elongated drain and is either mounted to a wall or is supported in relation to a subfloor structure of the inclined shower floor at a second one of its ends, and wherein, subsequently to mounting the elongated drain and the two elongated side members, the inclined shower floor has firstly been grouted to follow the longitudinal flanges of the elongated side members and has then been provided with a floor covering, such as tiles. Thereby, the above-mentioned properties may be obtained.

The present invention further relates to a method of installing a shower, whereby an elongated drain having a longitudinal direction is arranged at an inclined shower floor, whereby the elongated drain is mounted at a distance from a subfloor structure of the inclined shower floor before installation of the inclined shower floor, and whereby the elongated drain is provided with a front flange that is positioned under a floor covering of the inclined shower floor.

The method is characterised by that at least one elongated side member having a longitudinal direction is arranged with its longitudinal direction at right angles to the longitudinal direction of the elongated drain and at a side of the inclined shower floor, by that the at least one elongated side member has a longitudinal flange defining a slope of the inclined shower floor in relation to a horizontal room floor at least partly surrounding the shower floor, by that the longitudinal flange of the at least one elongated side member is positioned under the floor covering of the inclined shower floor, and by that the longitudinal flange of the at least one side member is connected to and arranged flush with the front flange of the elongated drain before installation of the inclined shower floor. Thereby, the above-mentioned properties may be obtained.

In an embodiment, according to the method, the shower is installed by means of a shower installation kit as described above. Thereby, the above-mentioned properties may be obtained.

In an embodiment, before installation of the inclined shower floor, the elongated drain is fixed to a wall and each one of the at least one elongated side members is connected at a first one of its ends to the elongated drain and is either mounted to a wall or is supported in relation to a subfloor structure of the inclined shower floor at a second one of its ends, and, subsequently to mounting the elongated drain and the at least one elongated side members, the inclined shower floor is firstly grouted to follow the longitudinal flange of the at least one elongated side member and is then provided with a floor covering, such as tiles. Thereby, the above-mentioned properties may be obtained.

The invention will now be explained in more detail below by means of examples of embodiments with reference to the very schematic drawing, in which FIG. 1 is a perspective view of a shower installation kit according to the invention;

FIG. 2 is a top view of the shower installation kit in FIG. 1;

FIG. 4 is a top view of the two elongated side members in FIG. 3;

FIGS. 5 to 17 illustrate different stages of the mounting of the shower installation kit in FIG. 1 in a bathroom in order to create a shower stall;

FIGS. 18 and 19 illustrate alternative embodiments of the mounted shower installation kit according to the invention;

In the following, in the different embodiments illustrated, similar elements will be designated by the same reference numerals.

Figure 1:
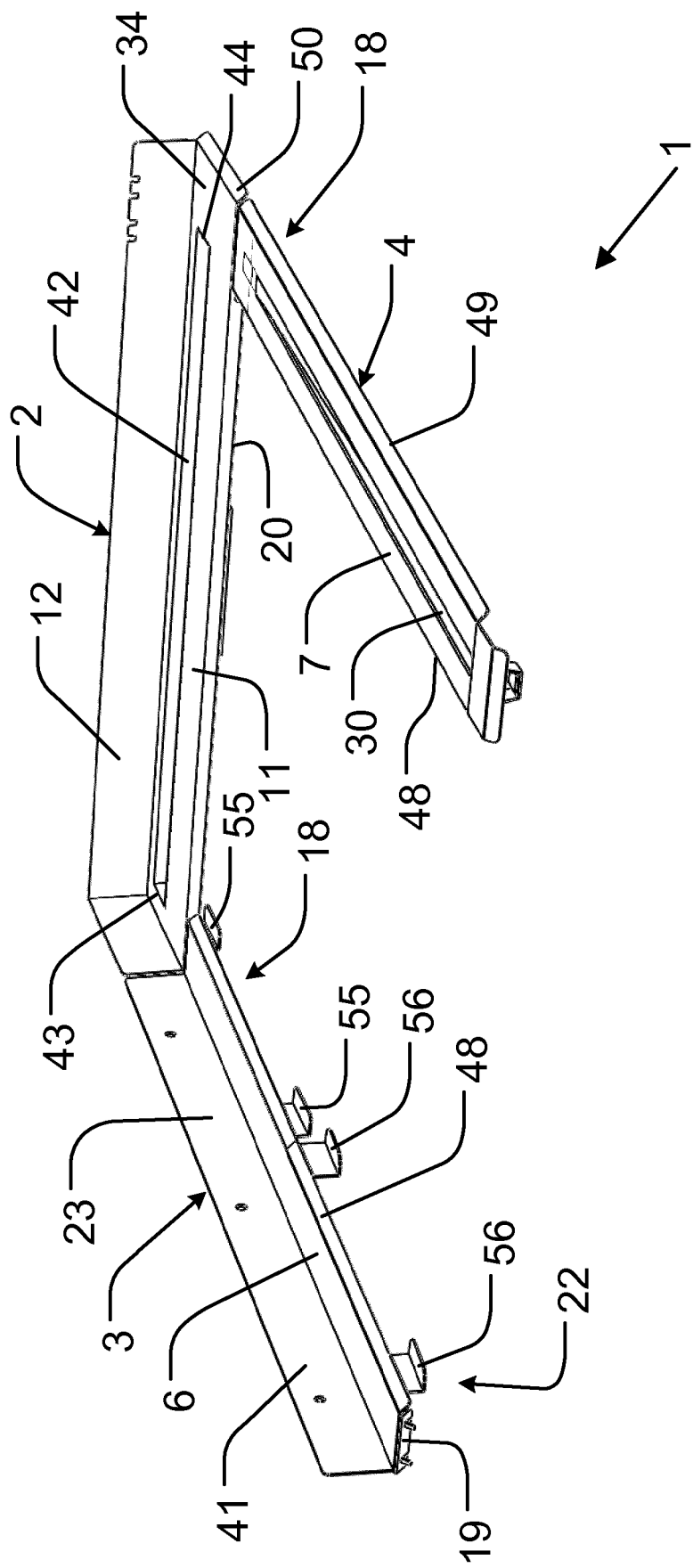
Figure 3:
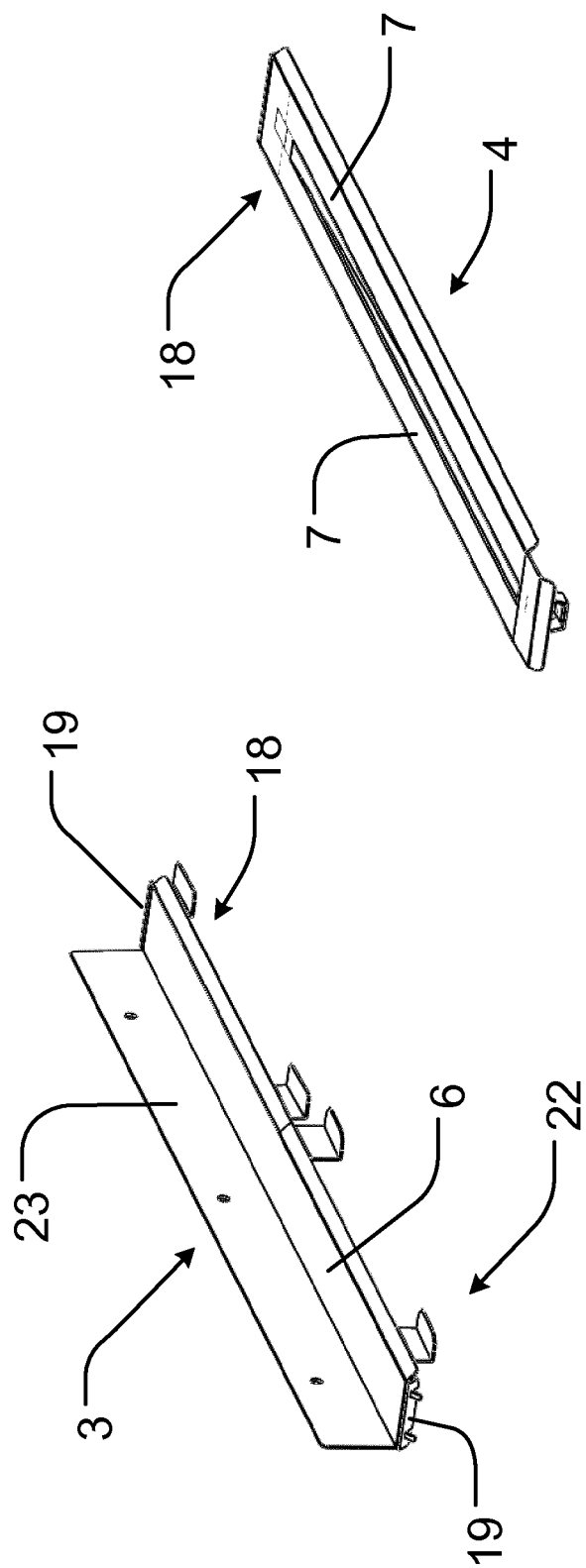
FIG. 3 is a perspective view of two elongated side members of the shower installation kit in FIG. 1.
Figure 22:
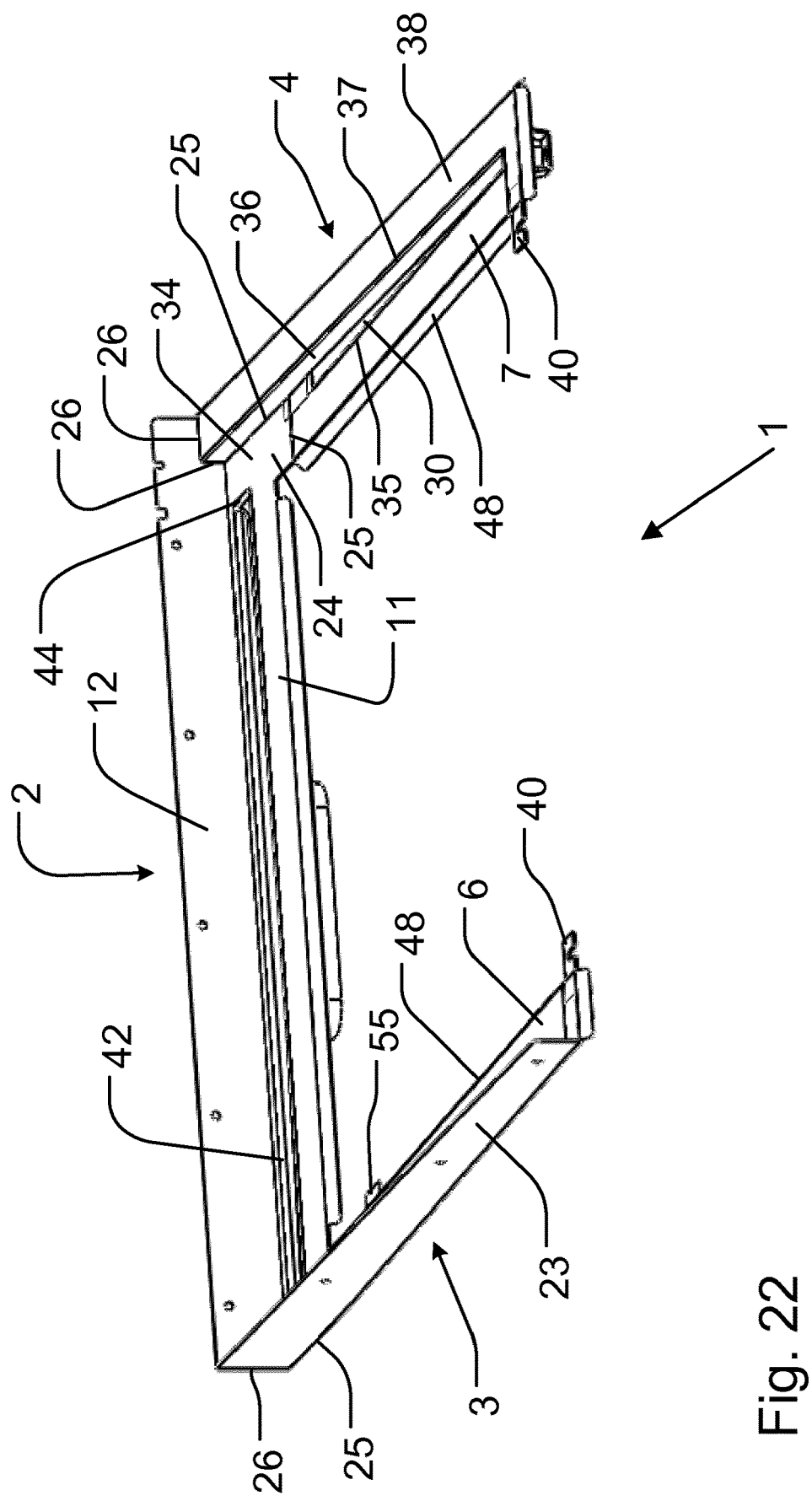
FIG. 22 is a perspective view of another embodiment of the shower installation kit according to the invention.

FIGS. 1 and 22 illustrate a shower installation kit 1 according to the invention, including an elongated drain 2 having a longitudinal direction L and two elongated side members 3, 4 each having a longitudinal direction. The elongated drain 2 is adapted to be arranged at an inclined shower floor 5 as illustrated in FIGS. 16 to 20 and 30. The two elongated side members 3, 4 are adapted to be arranged with their longitudinal directions at right angles to the longitudinal direction of the elongated drain 2, as illustrated in FIGS. 1 and 22, and at opposed sides of the inclined shower floor 5 as illustrated in FIGS. 16 to 20 and 30. Each elongated side member 3, 4 has a longitudinal flange 6, 7 adapted to define a slope of the inclined shower floor 5 in relation to a horizontal room floor 8 partially surrounding the inclined shower floor 5, as illustrated in FIGS. 16 to 20 and 30. The longitudinal flange 6, 7 of each elongated side member 3, 4 is adapted to be positioned under a floor covering 9 of the inclined shower floor 5. The elongated side members 3, 4 may be produced by deep drawing and/or punching of a metal plate, preferably stainless steel. Although two elongated side members 3, 4 are shown in the figures and described below, one of these may be dispensed with, whereby the advantages of the invention may still be obtained. For instance, in FIG. 1, preferably the left elongated side member 3 could be dispensed with, as the right elongated side member 4 in the illustrated embodiment has the further advantage of supporting a partition wall 32, as will be explained below.

Figure 24:
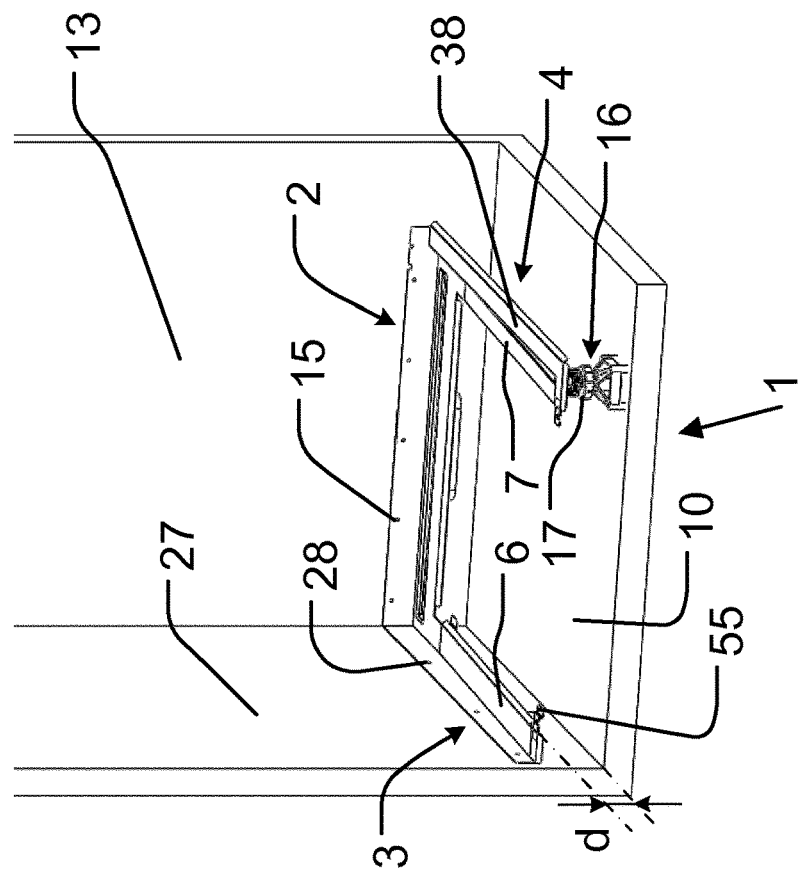
FIGS. 24 to 30 illustrate different stages of the mounting of the shower installation kit in FIG. 22 in a bathroom in order to create a shower stall.
Figure 30:
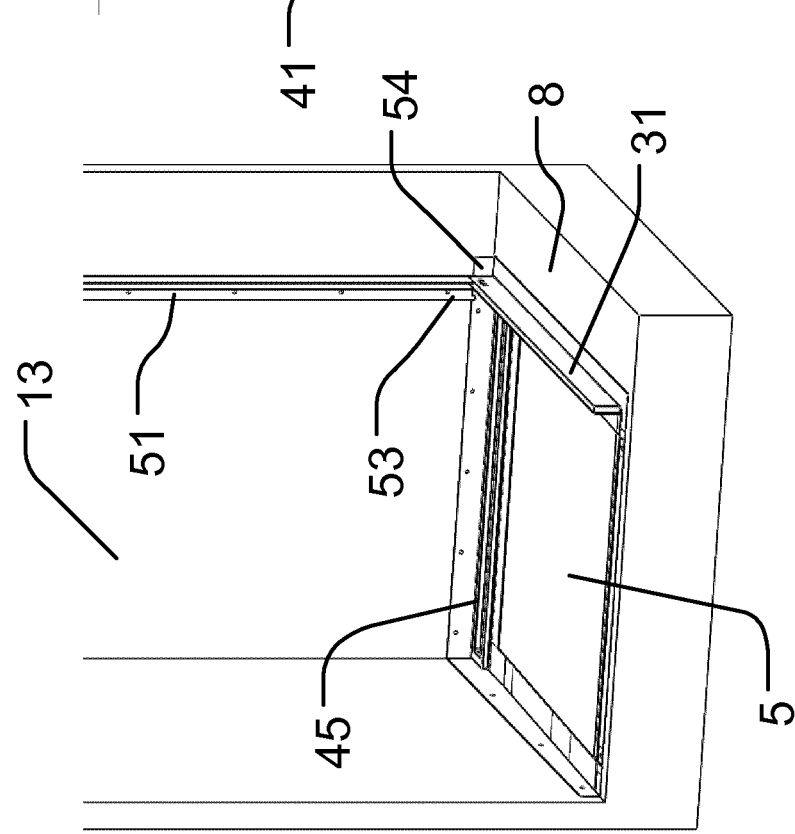

As illustrated in FIGS. 5 and 24, the elongated drain 2 is adapted to be mounted at a distance d from a subfloor structure 10 of the inclined shower floor 5 before installation of the inclined shower floor 5. The elongated drain 2 is provided with a front flange 11 adapted to be positioned under the floor covering 9 of the inclined shower floor 5. The longitudinal flanges 6, 7 of the side members 3, 4 are connected to and arranged flush with the front flange 11 of the elongated drain 2, as best illustrated in FIGS. 1, 2, 6 and 22 to 25. The elongated drain 2 is provided with a back flange 12 arranged oppositely to its front flange 11 and adapted to be mounted on a back wall 13, for instance by means of screws 15 and/or glue, as illustrated in FIGS. 5 and 6. Thereby, the elongated drain 2 may be positioned under a vertically extending wall covering 14 of the back wall 13, as illustrated in FIGS. 16 and 30.

Figure 25:
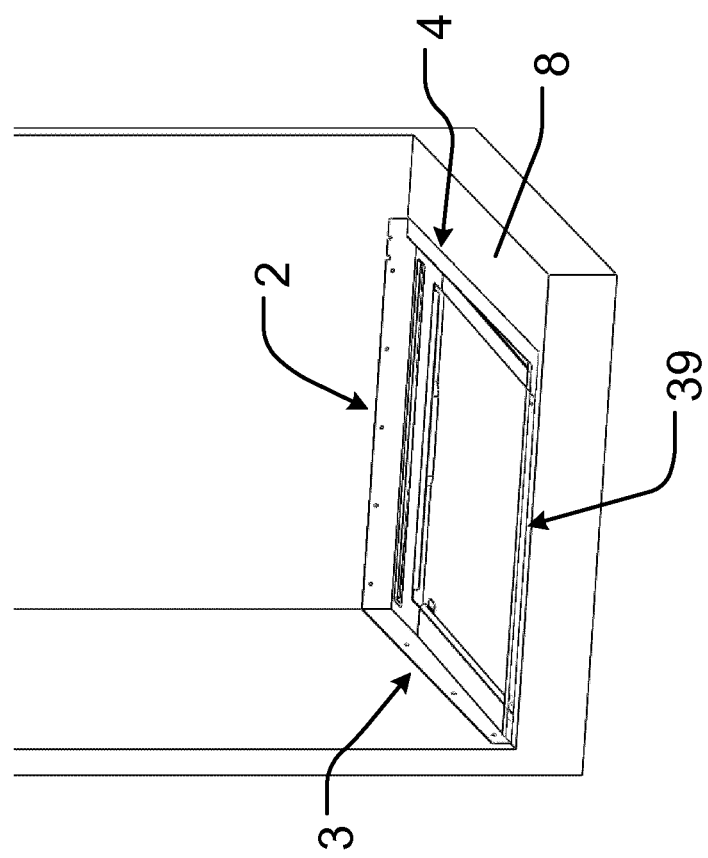

As illustrated in FIGS. 6, 24 and 25, the right side member 4 is provided with a, preferably height adjustable, support member 16 adapted to support the side member 4 against the subfloor structure 10 before installation of the inclined shower floor 5. The support member 16 illustrated in these figures is height adjustable by rotation of a ring-formed knob 17 forming a nut and is positioned at the opposite end of the side member 4 in relation to the front flange 11 of the elongated drain 2. The skilled person will understand that the height adjustable support member 16 may have any suitable configuration enabling proper height positioning of the side member 4 in relation to the subfloor structure 10. The support member 16 may for instance be height adjustable by means of a wedge.

Figure 32:
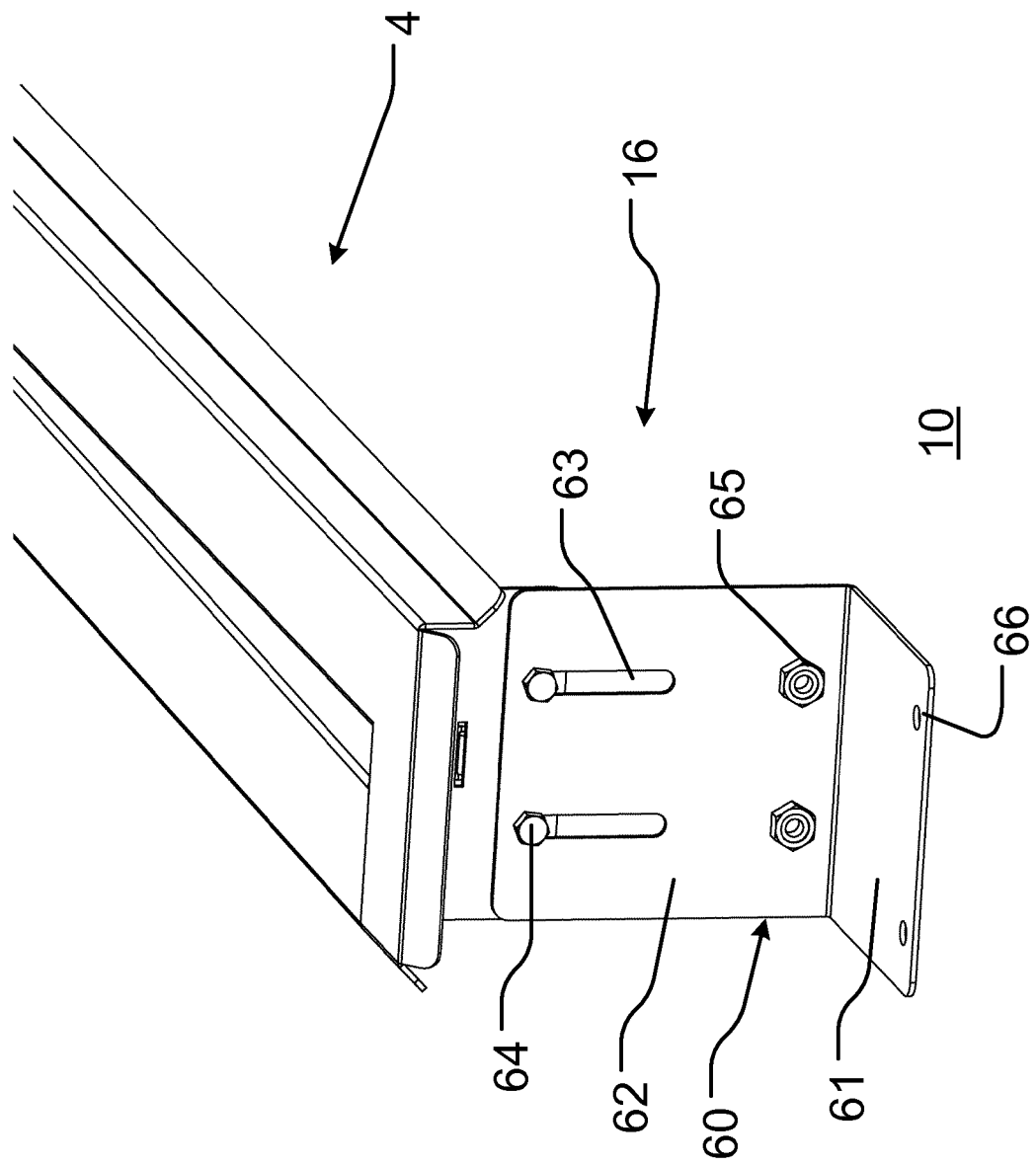
FIG. 32 illustrates an embodiment of a height adjustable support member adapted to support an elongated side member against a subfloor structure.

FIG. 32 illustrates another embodiment of the support member 16 in a height adjustable configuration. In this embodiment, the support member 16 includes an L-formed bracket 60 having a first flange 61 adapted to be placed flat on the subfloor structure 10 of the inclined shower floor 5 and a second flange 62 adapted to stand up vertically from the subfloor structure 10. The first flange 61 is provided with mounting holes 66 for mounting the flange on the floor. The second flange 62 is provided with two elongated apertures or slots 63 extending vertically in the mounted position of the L-formed bracket 60. Thereby, the end of the side member 4 may be mounted in a height adjustable manner by means of screws or bolts 64 inserted through the two slots 63, respectively, as illustrated in the figure, in that the bolts 64 may be slit in the longitudinal direction of the slots 63. Any suitable number of slots 63 with corresponding bolts 64 could be employed. In the embodiment illustrated in FIG. 32, the second flange 62 of the L-formed bracket 60 is provided with two nuts 65 welded onto a side of the flange 62. Corresponding holes have been formed through the second flange 62, so that not shown screws or bolts may be fixed. Thereby, the illustrated L-formed bracket 60 could be mounted in a height adjustable manner on a further, corresponding L-formed bracket that could be mounted on the subfloor 10, instead of the shown L-formed bracket 60. Thereby, two or more such L-formed brackets 60 could be used for extension, if necessary, and a wide degree of height adjustability could be obtained.

In the embodiment of the shower installation kit 1 according to the invention illustrated in FIGS. 1 to 21, each elongated side member 3, 4 is provided as a separate element having a first end 18 with a first connector 19 adapted for connection to a front edge 20 of the front flange 11 of the elongated drain 2, as best illustrated in FIGS. 1 to 4. The connector 19 has the form of an inclined edge face adapted to abut a corresponding inclined edge face of the front flange 11 of the elongated drain 2, wherein said edge faces are inclined to a top surface plane of the front flange 11 of the elongated drain 2 and are provided with holes 21 for connection bolts, screws or similar connection means. However, alternatively, the elongated side members 3, 4 may be welded or otherwise fixedly connected to the front edge 20 of the front flange 11 of the elongated drain 2.

Figure 33:
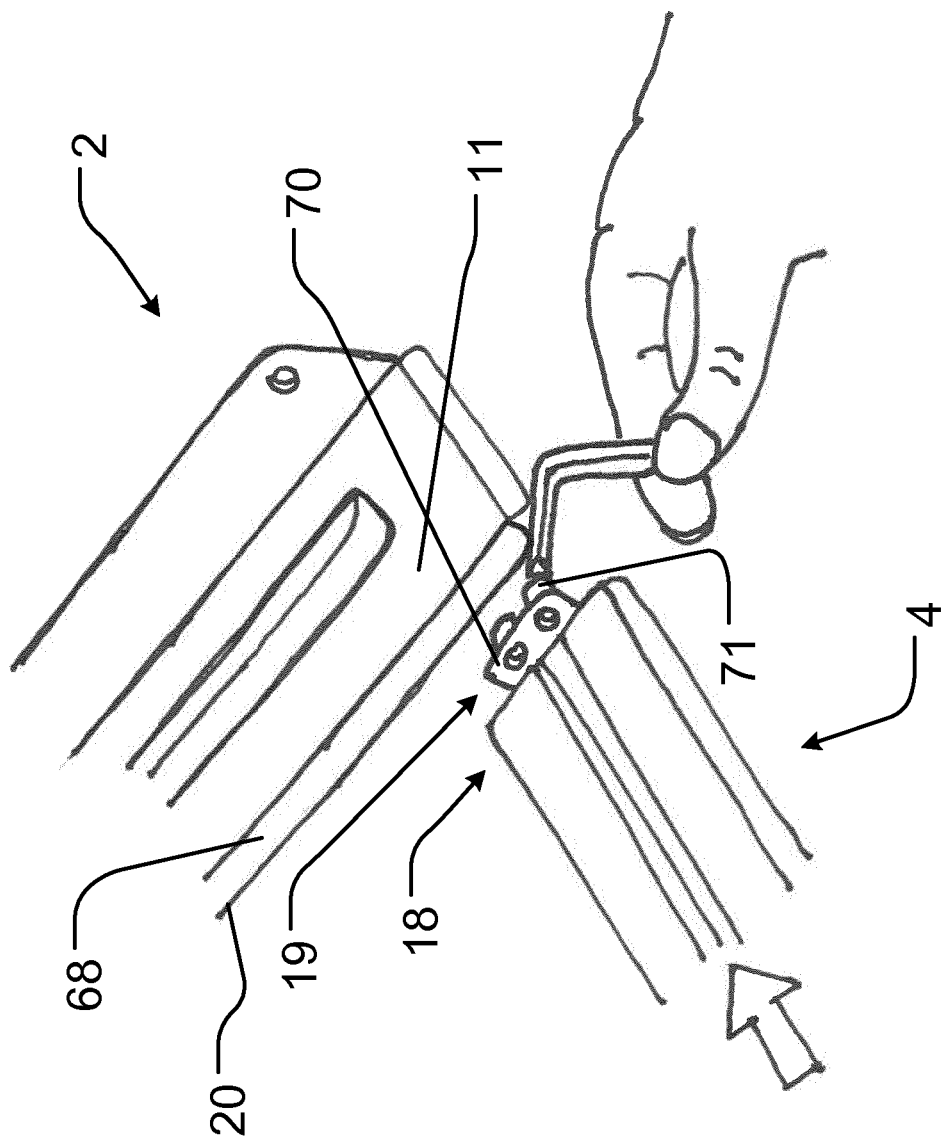
FIG. 33 is a perspective view illustrating an embodiment of a detachable connection between an elongated side member and an elongated drain, before connection.
Figure 34:
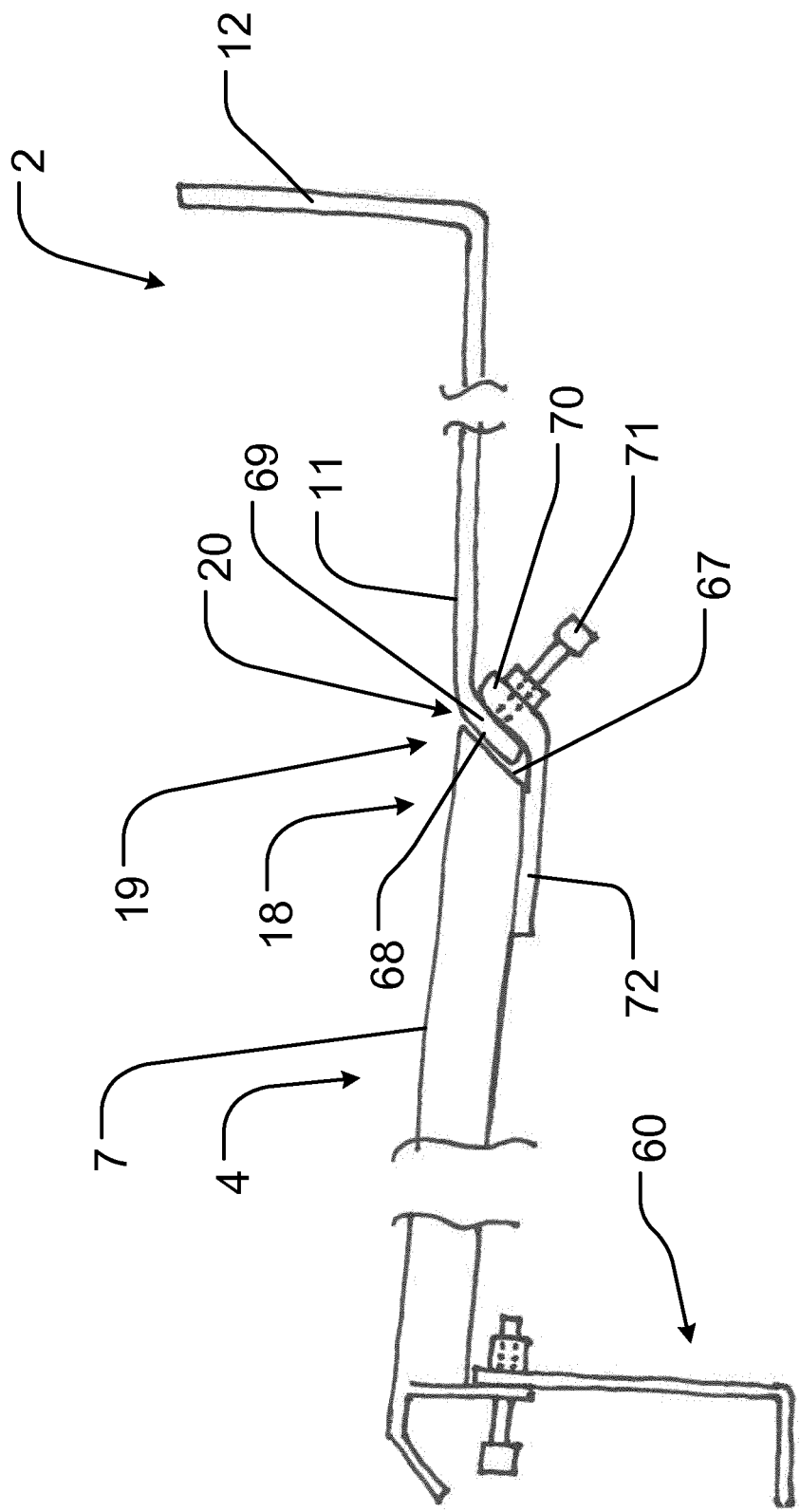
FIG. 34 illustrates the embodiment seen in FIG. 33, in a longitudinal section through the elongated side member, after the connection has been performed.

FIGS. 33 and 34 illustrate a way of detachably connecting an elongated side member 4, provided as a separate element, with the elongated drain 2. It is noted that in FIG. 34, part of the side member 4 and part of the elongated drain 2 have been let out from the illustration, which is indicated by means of wave-formed lines. According to this embodiment, the elongated side member 4 has a first end 18 with a first connector 19 adapted for connection to a front edge 20 of the front flange 11 of the elongated drain 2. The connector 19 includes an inclined edge face 67 adapted to abut a corresponding inclined edge face 68 of the front flange 11 of the elongated drain 2. The inclined edge face 68 of the front flange 11 of the elongated drain 2 is formed on an obliquely downwardly bent part 69 of the front flange 11 forming an obtuse angle between the downwardly bent part 69 and the rest of the front flange 11. The inclined edge face 67 of the connector 19 may likewise be formed as an obliquely downwardly bent part of the longitudinal flange 7 of the elongated side member 4 forming an acute angle between the obliquely downwardly bent part and the rest of the longitudinal flange 7, but it may just as well have any other suitable form, such as an obliquely cut end face of a U-formed profile (or similar element formed of bent metal plate) extending in the longitudinal direction of and attached to the lower side of the longitudinal flange 7 of the elongated side member 4. Such a U-formed profile may for instance be welded at the free ends of its side flanges (not illustrated in the figure) to the lower side of the longitudinal flange 7. In order to detachably connect the elongated side member 4 with the elongated drain 2, the elongated side member 4 is provided with a further connecting flange 70 that may for instance be formed as a bent up part of a bottom flange 72 connecting said side flanges of the above-mentioned U-formed profile attached to the lower side of the longitudinal flange 7. The connecting flange 70 may preferably extend in parallel with the inclined edge face 67 of connector 19 and may be provided with suitable pinching means adapted to pinch the inclined edge face 68 of the front flange 11 of the elongated drain 2 against the inclined edge face 67 of connector 19. In the embodiment illustrated, the pinching means has the form of one or more, such as two, screws, preferably unbraco screws 71, inserted into respective threads formed through the connecting flange 70. Thereby, by tightening the screws, the elongated side member 4 may be detachably fixed to the elongated drain 2.

The detachable connection of the elongated side member 4 with the elongated drain 2 illustrated in FIGS. 33 and 34 may take any suitable form. For instance, the obliquely downwardly bent part 69 of the front flange 11 of the elongated drain 2 is illustrated as forming an angle of approximately 45 degrees with the front flange 11, but may form any suitable angle, such as 90 degrees. Furthermore, the outer edge of the downwardly bent part 69 may also be bent around itself, for instance at an angle of 90 degrees. Thereby, a small channel may be formed under the front flange 11 in which channel tips of screws may conveniently grip and fix the elongated side member 4 to the elongated drain 2. The inclined edge face 67 and the connecting flange 70 may be bent at an angle corresponding to the angle of the downwardly bent part 69.

As illustrated in FIGS. 1 to 4, the separate element of the left elongated side member 3 has a second end 22 with a second connector 19 corresponding to the first connector 19. The left elongated side member 3 includes a vertical mounting flange 23 adapted to be mounted flat on a vertical side wall 27 by means of screws 28, nails or the like fastening means, and to be positioned under a vertically extending wall covering 29 of the side wall 27. Because the left elongated side member 3 is provided with a connector 19 at either end, it may be mounted at either side of a shower (inclined shower floor 5), according to requirements, by simply flipping over the member 6 in relation to the elongated drain 2. Thereby, the left elongated side member 3 may easily be mounted at the right side of the shower instead of at the left side as illustrated in the figures.

In a not shown embodiment, the first or second connector 19 may be connected to a corresponding connector of the height adjustable support member 16 illustrated in FIGS. 6, 24 and 25.

Figure 11:
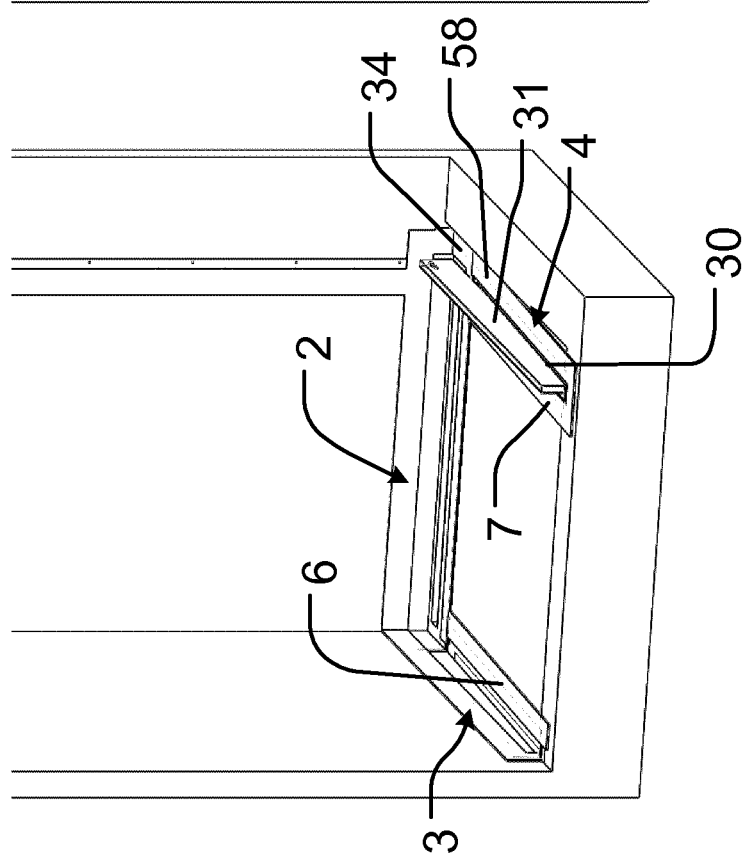
Figure 21:
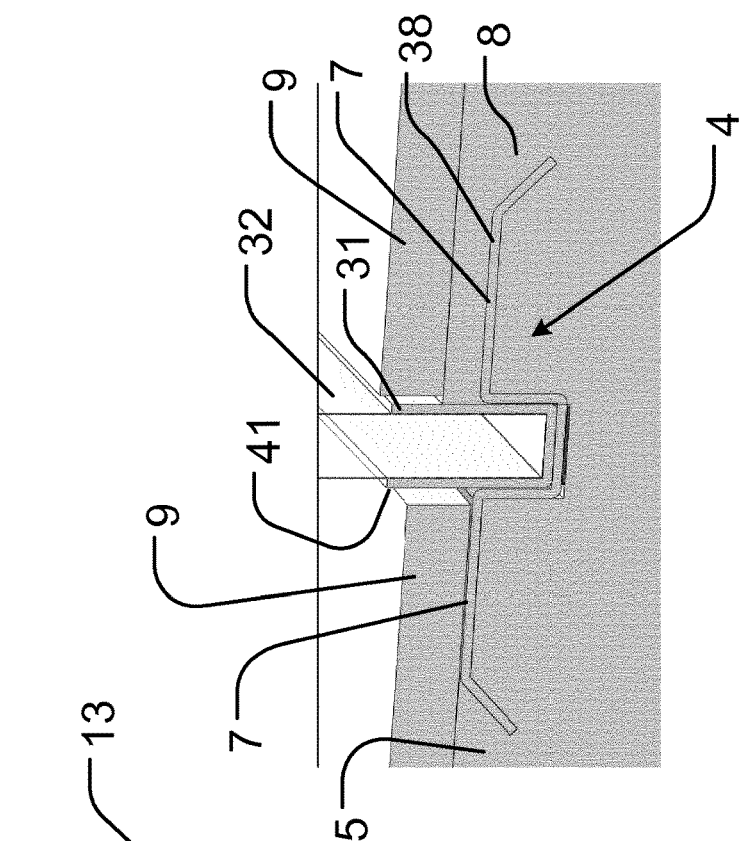
FIG. 21 illustrates a part of FIG. 20 on a greater scale.
Figure 20:
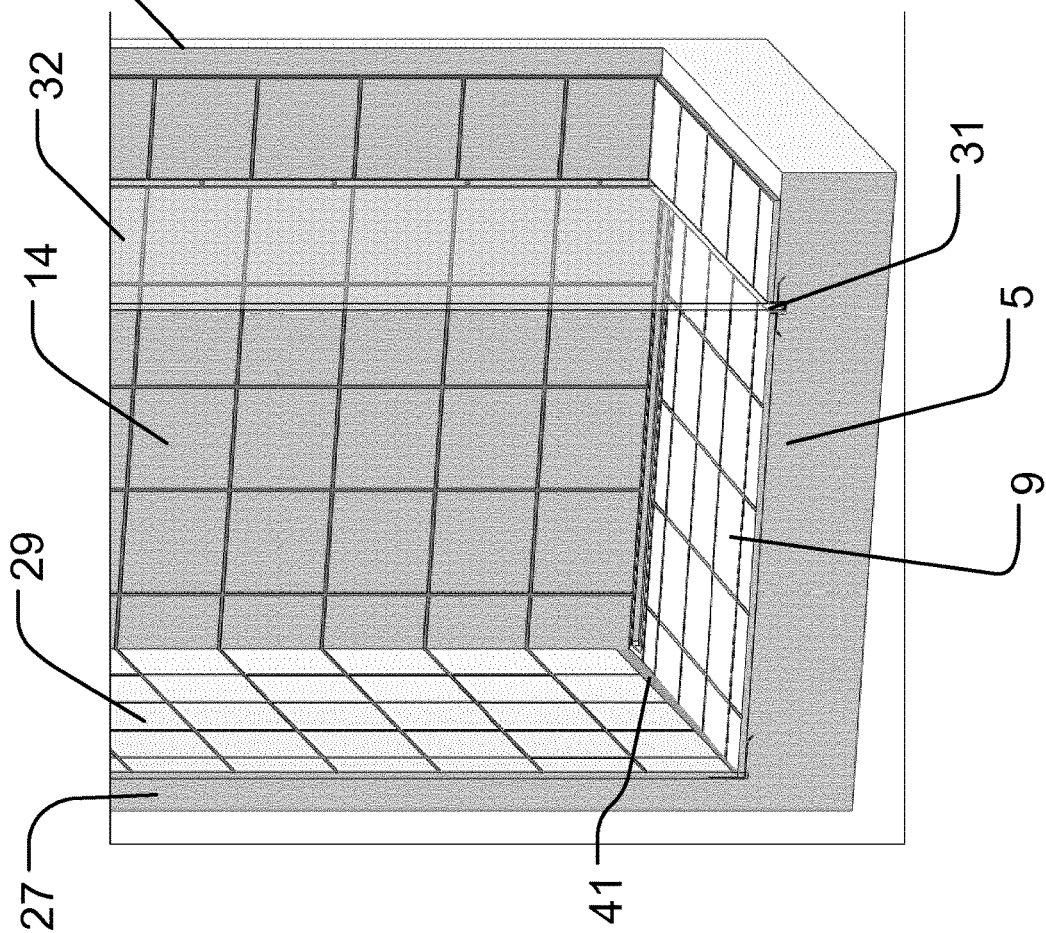
FIG. 20 is a perspective view illustrating a cross section through the mounted shower installation kit in FIG. 19.

The longitudinal flange 7 of the right elongated side member 4 has an upwardly open groove 30 extending in the longitudinal direction of the elongated side member 4 and having decreasing depth in the direction towards the elongated drain 2. As illustrated in FIGS. 11, 20 and 21, a U-formed rail 31 included by the right elongated side member 4 and having a constant cross-section along its length is inserted into the upwardly open groove 30 so that a lower edge of a partition wall 32 for the shower may be inserted into the U-formed rail 31. Thereby, the U-formed rail 31 and the partition wall 32 may extend horizontally, although the longitudinal flange 7 of the right elongated side member 4 slopes down to the elongated drain 2. The U-formed rail 31 extends up to the area of and abuts the back flange 12 of the elongated drain 2, whereby a bottom flange 33 of the U-formed rail 31 extends above a top surface plane 34 of the front flange 11 of the elongated drain 2, as it may be seen in FIG. 11. Thereby it may be obtained, even with a standard elongated drain 2 not having a groove for the U-formed rail 31, that the partition wall 32 by means of the U-formed rail 31 is supported all the way to the back wall 13 of the shower.

In the embodiment illustrated in FIGS. 22 to 30, the elongated side members 3, 4 are integrated with the front flange 11 of the elongated drain 2 in that the first end 18 of each elongated side member 3, 4 is welded to the front flange 11 along welding lines 25. In the embodiment shown, the front flange 11 of the elongated drain 2 is provided with a protrusion 24 at either end; the protrusion 24 being welded to the longitudinal flange 6, 7 of the respective elongated side member 3, 4. As it may be seen in FIG. 22, the vertical mounting flange 23 of the left elongated side member 3 extends to the back flange 12 of the elongated drain 2 and is welded thereto along a welding line 26.

In the embodiment illustrated in FIGS. 22 to 30, although it is preferred that the elongated side members 3, 4 are welded to the elongated drain 2, they may also be soldered or otherwise fixedly connected thereto, or the front flange 11 of the elongated drain 2 and the longitudinal flanges 6, 7 of the elongated side members 3, 4 may be manufactured from one piece of material, such as sheet metal. Naturally, in the embodiment illustrated in FIGS. 22 to 30, the elongated side members 3, 4 may alternatively be connected to the elongated drain 2 by means of connectors adapted to interconnect by means of connection bolts, screws or similar connection means, just as illustrated above in the embodiment illustrated in FIGS. 1 to 21.

Figure 23:
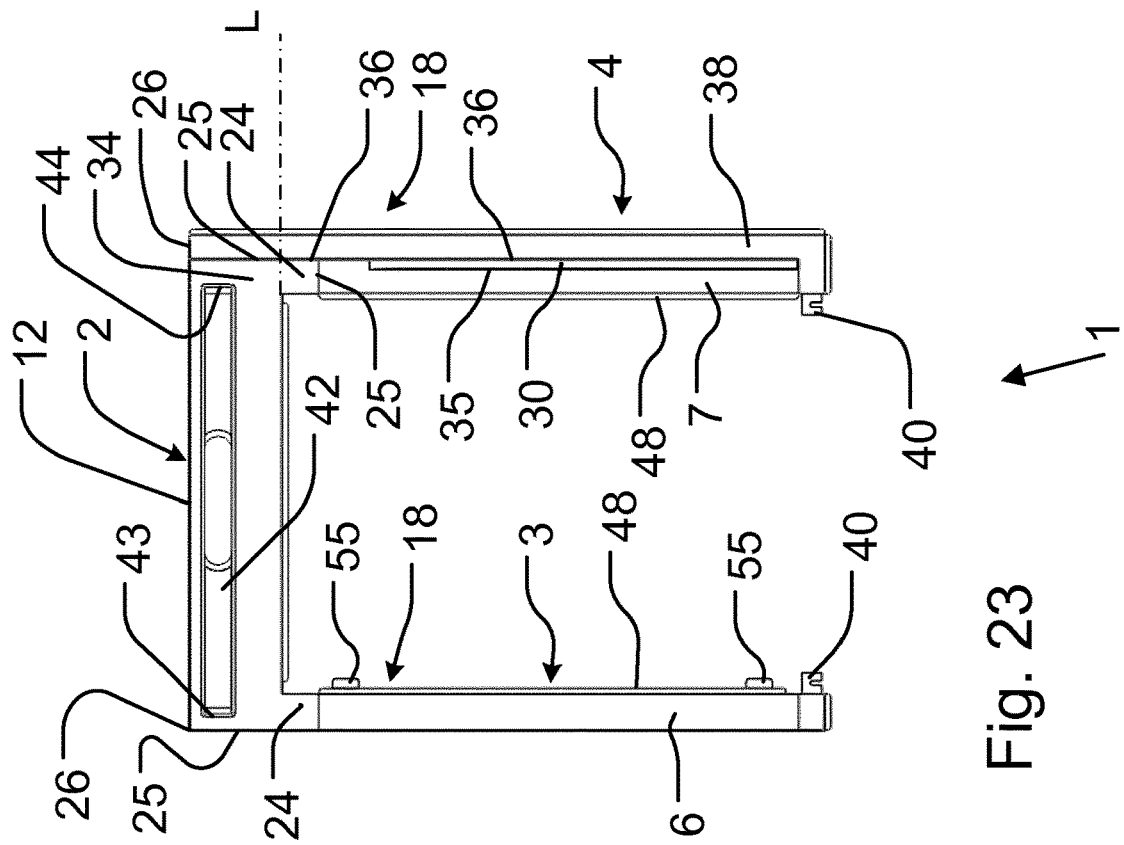
FIG. 23 is a top view of the shower installation kit in FIG. 22.

In the embodiment illustrated in FIGS. 22 to 30, the right longitudinal flange 7 is provided with an upwardly open groove 30 corresponding to that of the embodiment illustrated in FIGS. 1 to 21 and described above. However, in the embodiment illustrated in FIGS. 22 to 30, the upwardly open groove 30 of the longitudinal flange 7 is defined by two opposed wall members 35, 36, of which a first wall member 35 stops before reaching a line L through a front edge 20 of the front flange 11 of the elongated drain 2 as illustrated in FIG. 23, and of which a second wall member 36 extends up to the area of and abuts the back flange 12 of the elongated drain 2. The second wall member 36 is connected by a bend 37 to a raised longitudinal flange 38 of the right elongated side member 4, whereby the raised longitudinal flange 38 is adapted to be positioned under a floor covering 9 of the horizontal room floor 8, as illustrated in FIG. 30. An end of the second wall member 36 and of the raised longitudinal flange 38 is welded to the back flange 12 of the elongated drain 2 along welding lines 26.

Figure 29:
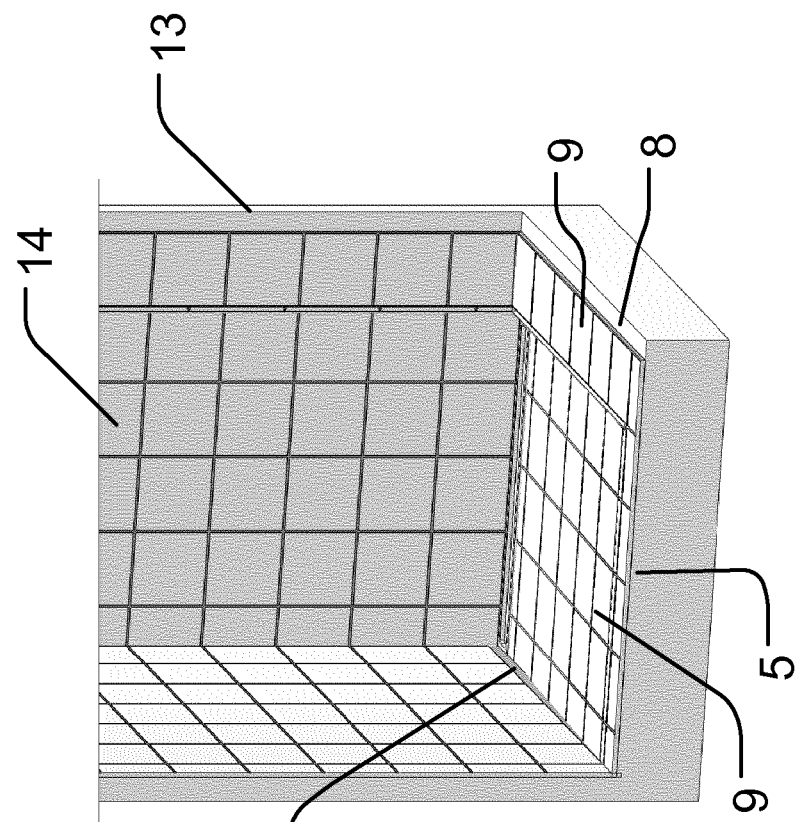

As illustrated in FIG. 29, and corresponding to the above described embodiment illustrated in FIGS. 20 and 21, a U-formed rail 31 included by the right elongated side member 4 and having a constant cross-section along its length is inserted into the upwardly open groove 30 illustrated in FIG. 22 so that a lower edge of a partition wall 32 for the shower may be inserted into the U-formed rail 31. Thereby, the U-formed rail 31 and the partition wall 32 may extend horizontally, although the longitudinal flange 7 of the right elongated side member 4 slopes down to the elongated drain 2. The U-formed rail 31 extends up to the area of and abuts the back flange 12 of the elongated drain 2, whereby a bottom flange 33 of the U-formed rail 31 extends above a top surface plane 34 of the front flange 11 of the elongated drain 2. Thereby it may be obtained that the partition wall 32 by means of the U-formed rail 31 is supported all the way to the back wall 13 of the shower.

Figure 31:
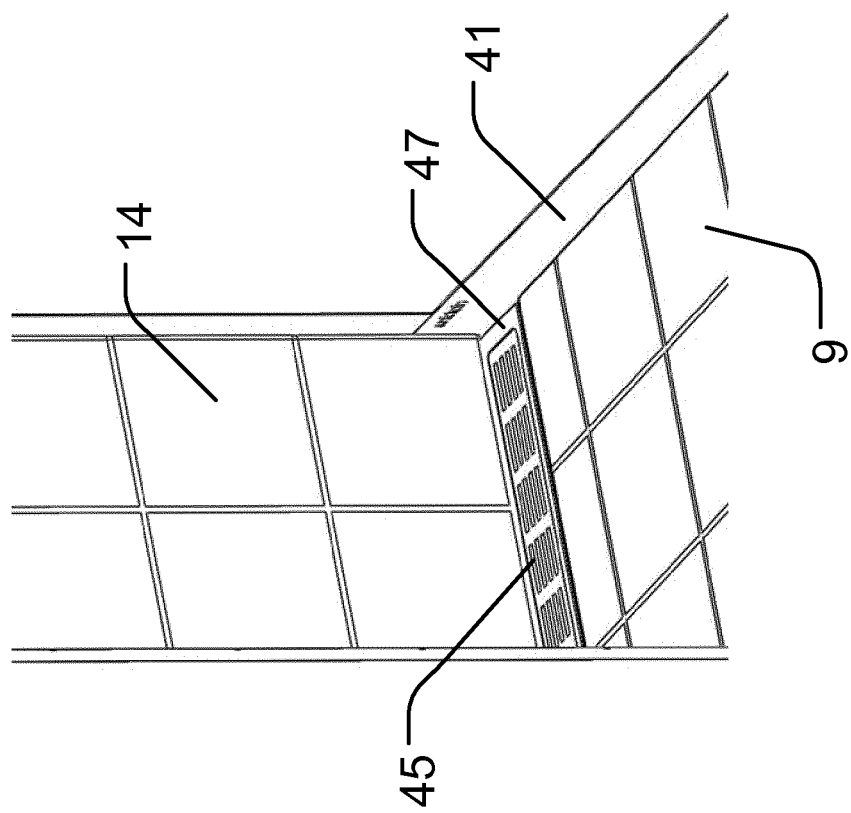
FIG. 31 illustrates a perspective view of a detail of the mounted shower installation kit according to both embodiments of the invention as illustrated in FIGS. 1 and 22, respectively.

As illustrated in FIG. 25, the two elongated side members 3, 4 positioned at opposed sides of the inclined shower floor 5 are provided with a connecting, bridge-like, member 39 that is connected detachably to each of said elongated side members 3, 4 at the end of said side members opposed to the end at the front flange 11 of the elongated drain 2. The detachable connection is provided by means of hooks 40 at the free ends of the elongated side members 3, 4 adapted to engage with pins or the like of the connecting, bridge-like, member 39. The embodiment illustrated in FIGS. 1 to 21 may just as well be provided with the connecting, bridge-like, member 39 illustrated in FIG. 25. In the embodiments illustrated in FIGS. 1 to 31 and described above, each elongated side member 3, 4 includes a transition face 41 visible for instance in FIGS. 16, 30 and 31. The transition face 41 is adapted to extend vertically and define a wedge-formed transition between a surface plane of the inclined shower floor 5 and a surface plane of the horizontal room floor 8. The left elongated side member 3 provides the transition face 41 in the form of part of the vertical mounting flange 23. The right elongated side member 4 provides the transition face 41 in the form of part of a face of the U-formed rail 31 facing the centre of the inclined shower floor 5. However, the U-formed rail 31 may be omitted, whereby the partition wall 32 for the shower may be inserted directly into the upwardly open groove 30 of the right elongated side member 4; in this case, the right elongated side member 4 provides the transition face 41 in the form of part of a face of the partition wall 32, whereby the partition wall 32 is understood to be included by the right elongated side member 4.

As best illustrated in FIGS. 1, 2, 22 and 23, the elongated drain 2 includes a longitudinal drain opening 42 arranged along the front flange 11 of the elongated drain and having a first end 43 and a second end 44. Preferably, the transition face 41 of a respective elongated side member 3, 4 is located at a position less than about 5 centimetres, preferably less than about 3 centimetres, and most preferred less than about 2 centimetres, from the nearest end 43, 44 of the longitudinal drain opening 42 measured in the longitudinal direction of the elongated drain 2. Thereby, it may be obtained that a standard grate 45, including a not completely visible surrounding frame associated therewith, mounted over the longitudinal drain opening 42 extends very closely up to or even abuts said wedge-formed transition and thereby visually extends along the full width of the inclined shower floor 5 and possibly extends at least very closely up to an existing wall 27 of a building or a partition wall 32 at the side of the shower floor as illustrated for instance in FIGS. 20 and 31. Said not completely visible frame associated with the grate 45 may preferably be a frame that is mounted fixedly on top of the elongated drain 2, so that the grate 45 may be mounted detachably within the frame. Said frame may be dispensed with.

Furthermore, when the longitudinal drain opening 42 is provided with the corresponding elongated grate 45, preferably including a surrounding frame associated with the grate, having a first end 46 and a second end 47, it is preferred that the transition face 41 of each elongated side member 3, 4 abuts or is positioned nearer than about 7 millimetres, preferably nearer than about 5 millimetres, and most preferred nearer than about 3 millimetres, from a corresponding one of the first and second ends 46, 47 of the elongated grate 45 including the possible surrounding frame associated with the grate. Thereby, it may be obtained that the grate 45 visually extends along the full width of the inclined shower floor 5 and possibly extends at least very closely up to an existing wall of a building or a partition wall at the side of the shower floor.

Furthermore, it is preferred that the longitudinal flange 6, 7 of each elongated side member 3, 4 has an inner edge 48 facing the centre of the inclined shower floor 5, and that said inner edges 48 are positioned between the first and second ends 43, 44 of the longitudinal drain opening 42 measured in the longitudinal direction of the elongated drain 2, as best illustrated in FIGS. 2 and 23. Thereby, a suitably broad longitudinal flange 6, 7 in terms of stability of the connection between the elongated side member 3, 4 and the shower floor 5 may be obtained and at the same time it may be obtained that a standard grate 45, preferably including a surrounding frame associated with the grate 45, mounted over the longitudinal drain opening 42 extends very closely up to or even abuts said wedge-formed transition and thereby visually extends along the full width of the inclined shower floor 5 and possibly extends at least very closely up to an existing wall 27 of a building or a partition wall 32 at the side of the inclined shower floor.

Furthermore, in the embodiment illustrated in FIGS. 1 to 21, it is seen that the longitudinal flange 7 of the right elongated side member 4 has an outer edge 49 facing away from the centre of the inclined shower floor 5 and being arranged in continuation of and flush with a right end edge 50 of the front flange 11 of the elongated drain 2. Thereby, it may be ensured that a smooth transition also between the outer edge 49 of the longitudinal flange 7 of the elongated side member 4 and a standard elongated drain is obtained, so that flush connection between flanges, a membrane and floor covering may be obtained. Naturally, for a standard elongated drain adapted to a right hand corner, instead of the illustrated left hand corner, the left elongated side member 3 could have an outer edge 49 facing away from the centre of the inclined shower floor 5 and being arranged in continuation of and flush with a left end edge of the front flange 11 of the elongated drain 2.

As illustrated in FIGS. 9 to 16 and 28 to 30, the shower installation kit 1 according to the invention may include a longitudinal wall flange 51 having a longitudinal direction and being adapted to be arranged with its longitudinal direction vertically and to be positioned under the vertically extending wall covering 14 of a back wall 13. The longitudinal wall flange 51 is provided with a U-formed rail 52 mountable along a centre line of the longitudinal wall flange 51 in order to extend through or at least be accessible through the vertically extending wall covering 14 for insertion of an edge of the partition wall 32 for the shower into the U-formed rail 52. A lower end of the longitudinal wall flange 51 is provided with an engagement part 53 fitting a corresponding engagement part 54 of the back flange 12 of the elongated drain 2 as illustrated for instance in FIGS. 9 and 29.

According to the invention, the shower installation kit 1 illustrated in FIGS. 1 to 4 may be used for the installation of a shower as illustrated in FIGS. 5 to 21 and described in the following. Before installation of the inclined shower floor 5, the elongated drain 2 is fixed to the back wall 13 as illustrated in FIG. 5. Subsequently, the two elongated side members 3, 4 are connected at a first end 18 to the elongated drain 2 as illustrated in FIG. 6 and explained above. The left elongated side member 3 is mounted to the vertical side wall 27 so that the longitudinal flange 6 of the left elongated side member 3 slopes correctly down to the elongated drain 2. This may be done by placing a spirit level on top of a pair of appropriately positioned flaps 55 on the left elongated side member 3. It is noted that in case the left elongated side member 3 as illustrated would have to be arranged at the right side of the elongated drain 2, the spirit level would have to be positioned on top of another pair of appropriately positioned flaps 56 on said elongated side member. The right elongated side member 4 is supported in relation to the subfloor structure 10 of the inclined shower floor 5 at a second end by means of the height adjustable support member 16. The height of said second end is adjusted correctly by rotation of the ring-formed knob 17 so that a bottom of the upwardly open groove 30 is horizontal, which may be done by temporarily inserting the U-formed rail 31 in the upwardly open groove 30 and placing a spirit level on top of it. Thereby, it may be obtained that the longitudinal flange 7 of the right elongated side member 4 slopes correctly down to the elongated drain 2.

Figure 8:
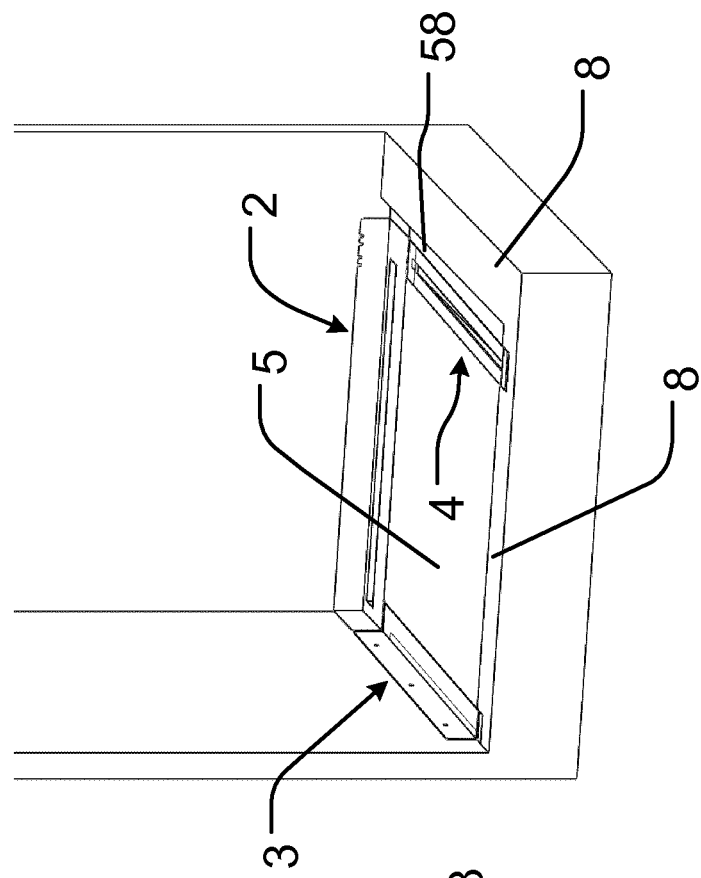
Figure 7:
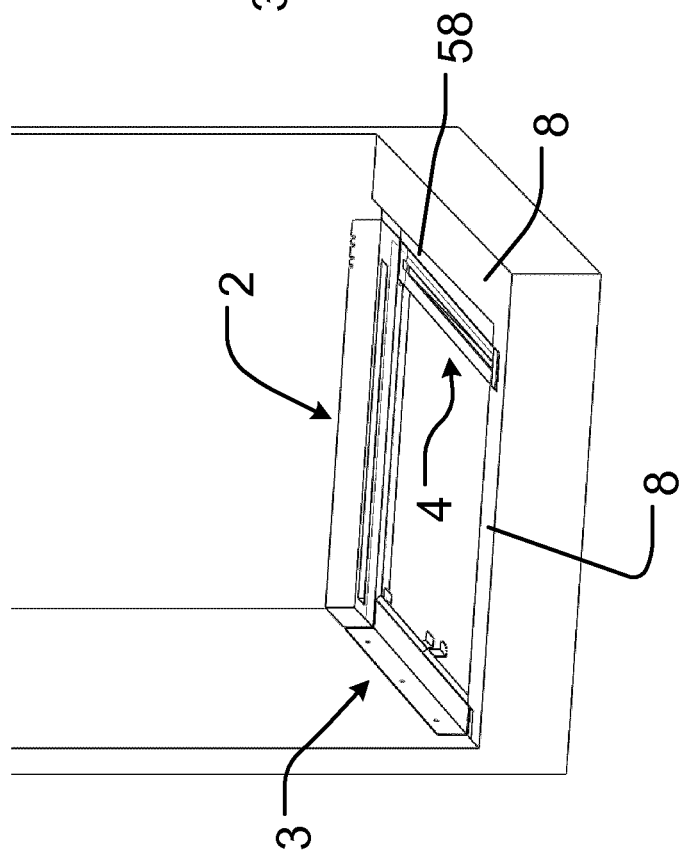
Figure 10:
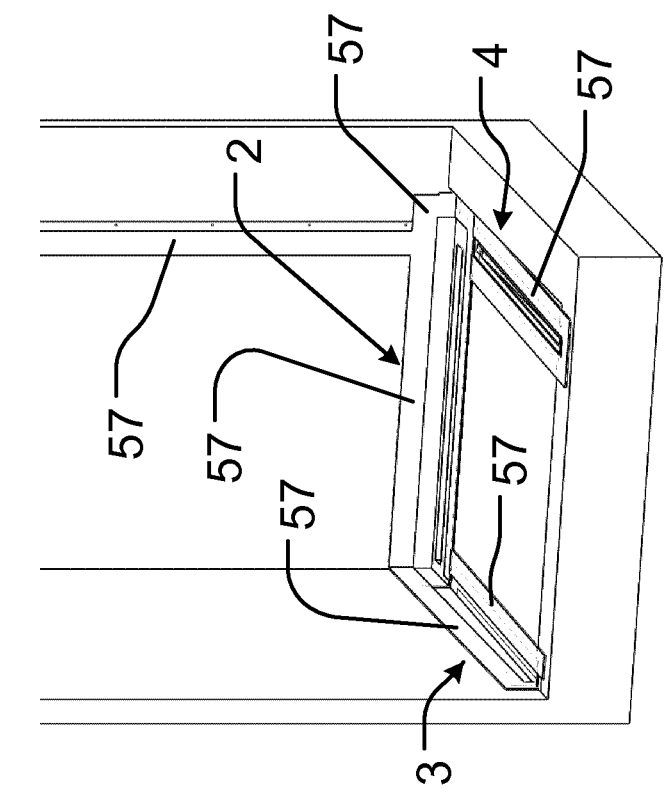
Figure 9:
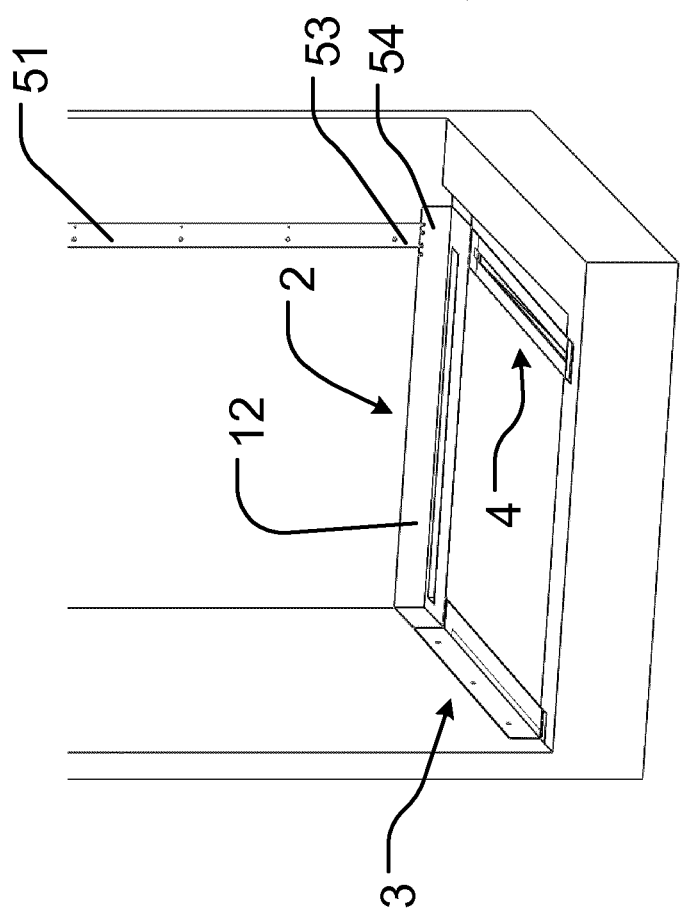
Figure 12:
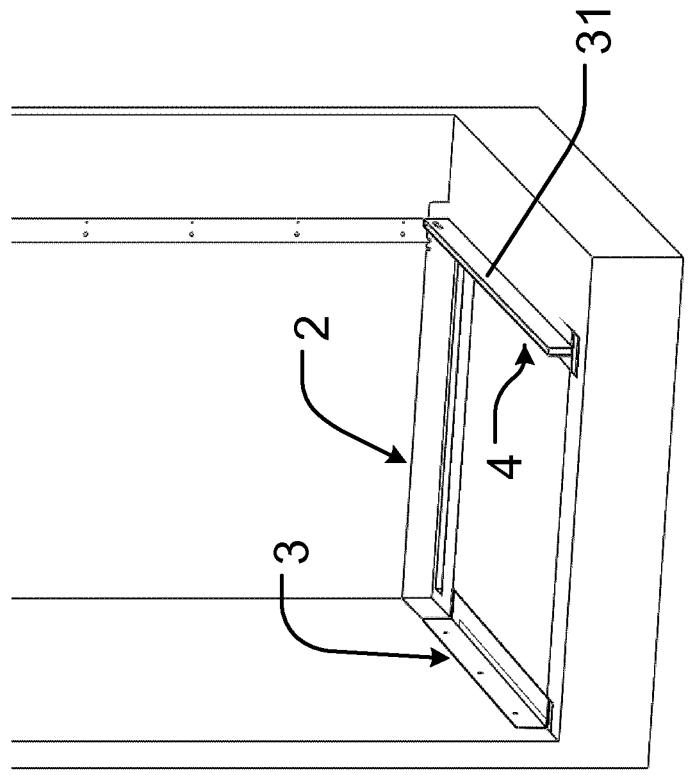

Subsequently, the horizontal room floor 8 partially surrounding the shower area where the inclined shower floor 5 is to be installed is grouted, whereby a wedge-formed volume 58 is maintained open so that the horizontal room floor 8 is still spaced in relation to the right elongated side member 4, as illustrated in FIG. 7. Subsequently, the inclined shower floor 5 is grouted to follow the longitudinal flanges 6, 7 of the elongated side members 3, 4, as illustrated in FIG. 8. In FIG. 9, the longitudinal wall flange 51 has been mounted on the back wall 13 and connected to the elongated drain 2 as explained above. In FIG. 10, reinforcement fabric 57 has been applied to all edges where steel and concrete abut each other. In FIG. 11, the U-formed rail 31 has been inserted into the upwardly open groove 30. In FIG. 12, the above-mentioned wedge-formed volume 58 has been grouted so that the horizontal room floor 8 extends all up to the U-formed rail 31.

Figure 17:
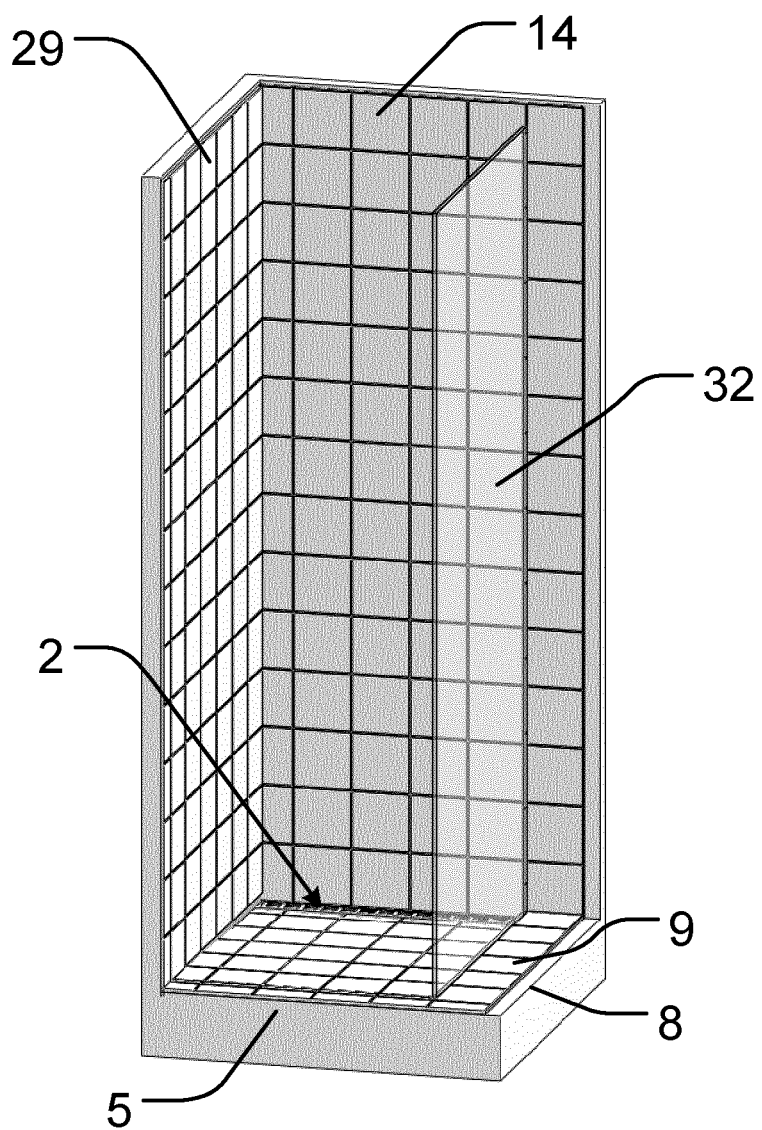

In FIG. 13, the longitudinal wall flange 51 has been provided with a longitudinally extending foam packing 59; in FIG. 14, the grate 45, including a not completely visible surrounding frame associated with the grate, has been mounted over the longitudinal drain opening 42; and in FIG. 15, the U-formed rail 52 has been mounted on the longitudinal wall flange 51 so that the longitudinally extending foam packing 59 is sandwiched between the longitudinal wall flange 51 and the U-formed rail 52. In FIG. 16, the inclined shower floor 5 and the horizontal room floor 8 partially surrounding the inclined shower floor 5 has been provided with the floor covering 9, such as tiles, the back wall 13 has been provided with the vertically extending wall covering 14, such as tiles, and the side wall 27 has been provide with the vertically extending wall covering 29, such as tiles. In FIG. 17, the partition wall 32 has been mounted so that its lower edge is inserted into the U-formed rail 31 extending through the floor covering 9 and its back edge is inserted into the U-formed rail 52 extending through the vertically extending wall covering 14. FIG. 18 illustrates an alternative embodiment having a lower U-formed rail 31 not extending up through the floor covering 9, and FIG. 19 illustrates yet another embodiment having a relatively high U-formed rail 31 extending up through the floor covering 9.

According to the invention, the shower installation kit 1 illustrated in FIGS. 22 and 23 may be used for the installation of a shower as illustrated in FIGS. 24 to 30 and described in the following. The overall installation procedure corresponds to the one described above for the shower installation kit 1 illustrated in FIGS. 1 to 4; however with some differences as described in the following.

Before installation of the inclined shower floor 5, the elongated drain 2 including the two elongated side members 3, 4 is fixed to the back wall 13 as illustrated in FIG. 24. The left elongated side member 3 is fixed to the vertical side wall 27 whereby it is ensured that the longitudinal flange 6 of the left elongated side member 3 slopes correctly down to the elongated drain 2. This may be done by placing a spirit level on top of a pair of appropriately positioned flaps 55 on the left elongated side member 3. The right elongated side member 4 is supported in relation to the subfloor structure 10 of the inclined shower floor 5 at a second end by means of the height adjustable support member 16. The height of said second end is adjusted correctly by rotation of the ring-formed knob 17 so that the raised longitudinal flange 38 of the right elongated side member 4 is horizontal, which may be done by placing a spirit level on top of it. Thereby, it may at the same time be obtained that the longitudinal flange 7 of the right elongated side member 4 slopes correctly down to the elongated drain 2. It is noted that although the correct slope of the two elongated side members 3, 4 substantially is ensured by the fact that these are connected integrally with the elongated drain 2 and the back flange 12 of the elongated drain 2 is placed flat on the back wall 13, the integrated structure of the elongated drain 2 and the two elongated side members 3, 4 may be somewhat elastic; therefore the procedure of checking the correct slope of each elongated side member 3, 4 may be preferred. In FIG. 25, the connecting, bridge-like, member 39 has been connected detachably to the hooks 40 at the free end of each of said elongated side members 3, 4 as explained above.

Figure 26:
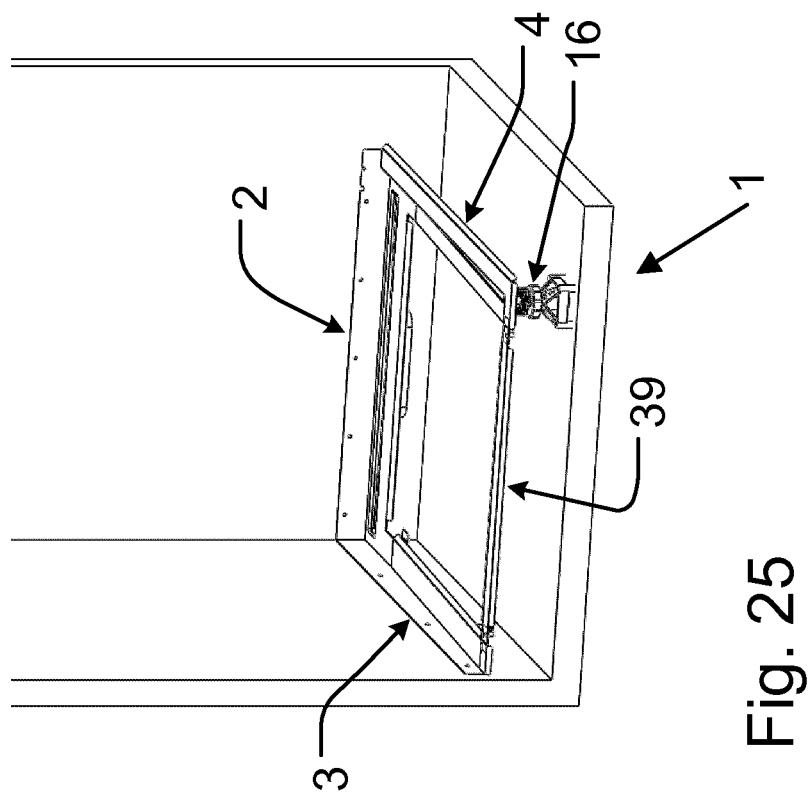

Subsequently, the horizontal room floor 8 partially surrounding the shower area where the inclined shower floor 5 is to be installed is grouted, as illustrated in FIG. 26. It is noted that the horizontal room floor 8 has been grouted so that it extends all up to the (horizontal) raised longitudinal flange 38 of the right elongated side member 4. Due to the presence of the horizontal raised longitudinal flange 38, at this stage, it is not necessary, as mentioned by the above-described procedure for installing the shower installation kit 1 illustrated in FIGS. 1 to 4, to maintain a wedge-formed volume open.

Figure 28:
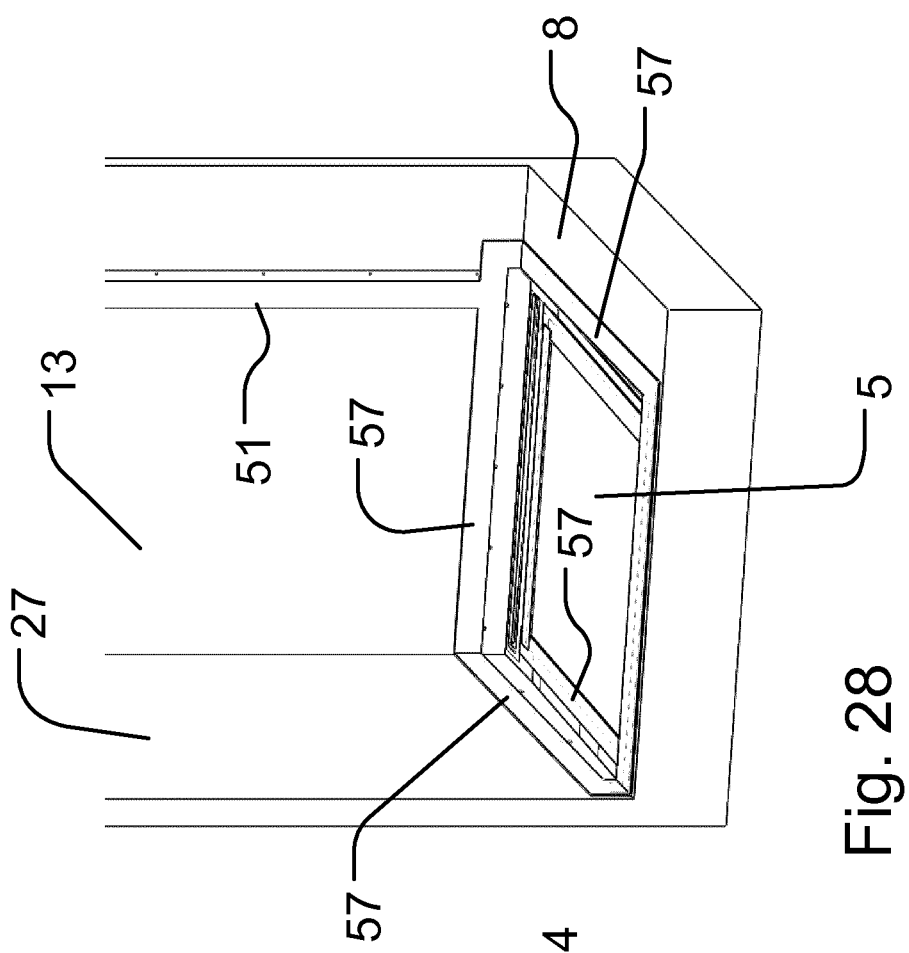
Figure 27:
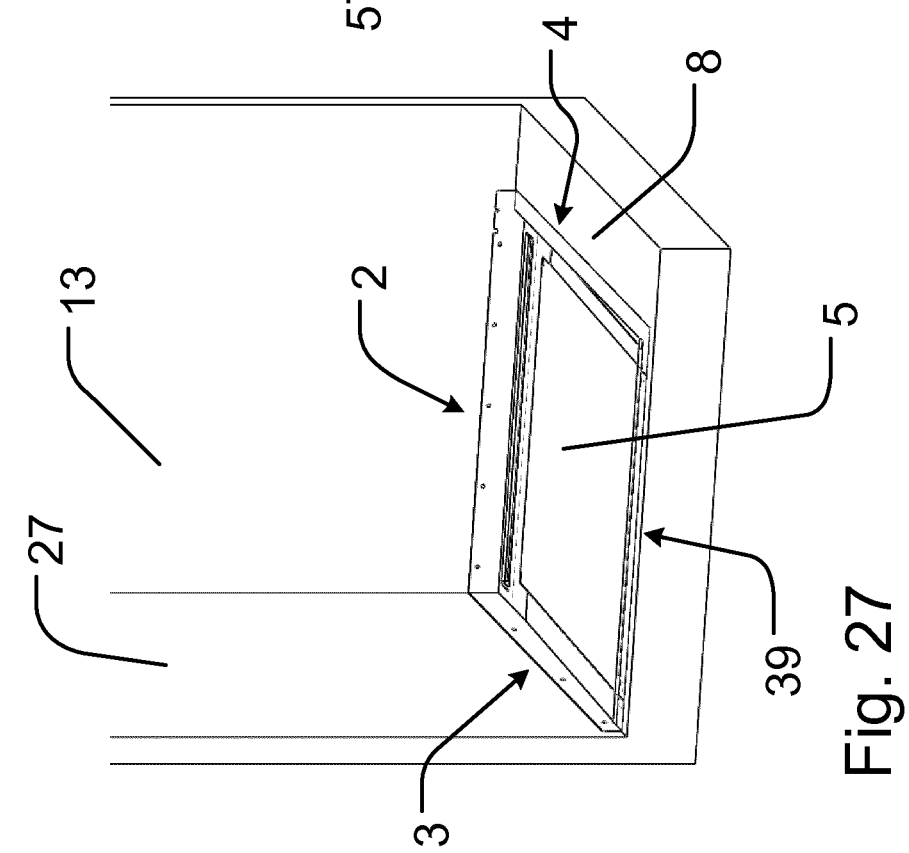

Subsequently, the inclined shower floor 5 is grouted to follow the longitudinal flanges 6, 7 of the elongated side members 3, 4, as illustrated in FIG. 27. In FIG. 28, the longitudinal wall flange 51 has been mounted on the back wall 13 and connected to the elongated drain 2 as explained above. Furthermore, reinforcement fabric 57 has been applied to all edges where steel and concrete abut each other.

In FIG. 29, the U-formed rail 31 has been inserted into the upwardly open groove 30.

Furthermore, the longitudinal wall flange 51 has been provided with the longitudinally extending foam packing 59 (not visible); the grate 45 including a surrounding frame associated with the grate has been mounted over the longitudinal drain opening 42; and the U-formed rail 52 has been mounted on the longitudinal wall flange 51 so that the longitudinally extending foam packing 59 is sandwiched between the longitudinal wall flange 51 and the U-formed rail 52. In FIG. 30, the inclined shower floor 5 and the horizontal room floor 8 partially surrounding the inclined shower floor 5 has been provided with the floor covering 9, such as tiles, the back wall 13 has been provided with the vertically extending wall covering 14, such as tiles, and the side wall 27 has been provide with the vertically extending wall covering 29, such as tiles. Subsequently, the partition wall 32 has been mounted in the same way as illustrated in FIG. 17 and explained above. The two alternatives illustrated in FIGS. 18 and 19 having a, respectively, low and high U-formed rail 31, are also possible for this embodiment.

The invention claimed is:

1. A shower installation kit used with a subfloor structure and an inclined shower floor including:
   an elongated drain having a longitudinal direction and arranged at the inclined shower floor;
   the elongated drain is mounted at a distance from the subfloor structure of the inclined shower floor before installation of the inclined shower floor;
   a front flange of the elongated drain, the front flange positioned under floor covering of the inclined shower floor;
   at least one elongated side member having a member longitudinal direction and is arranged with the member longitudinal direction at right angles to the longitudinal direction of the elongated drain and at a side of the inclined shower floor;
   a first longitudinal flange having a defined slope greater than zero, the first longitudinal flange disposed on the at least one elongated side member;
   the first longitudinal flange slopes down towards the elongated drain when positioned on the subfloor structure;
   the first longitudinal flange of the at least one elongated side member is positioned under floor covering of the inclined shower floor, and the first longitudinal flange of the at least one elongated side member is further connected to and arranged flush with the front flange of the elongated drain;
   the at least one elongated side member further includes a raised second longitudinal flange that is positioned under floor covering of horizontal room floors when the installation kit is positioned on the subfloor structure; and
   wherein the defined slope of the first longitudinal flange dictates inclination of the shower floor by serving as a guide when a levelling layer is grouted for inclination of the shower floor;
   wherein at least one of the at least one elongated side member is provided with a support member adapted to support the at least one elongated side member against the subfloor structure of the inclined shower floor before installation of the inclined shower floor;
   the support member is height adjustable; and
   the support member is positioned at a distance from the front flange of the elongated drain;
   and the support member is further positioned at the opposite end of the at least one elongated side member in relation to the front flange of the elongated drain.

2. The shower installation kit according to claim 1, wherein the elongated drain has two elongated side members arranged at opposed sides of the inclined shower floor.

3. The shower installation kit according to claim 1, wherein each of the at least one elongated side member is a separate element having a first end with a first connector adapted for connection to a front edge of the front flange of the elongated drain; and
   a connector having an inclined edge face that abuts a corresponding inclined edge face of the front flange of the elongated drain, the corresponding inclined edge face is inclined to a top surface plane of the front flange of the elongated drain and the corresponding inclined edge face defines a hole for connection.

4. The shower installation kit according to claim 1, further including a separate element of the at least one elongated side member, the separate element having a second end with a second connector corresponding to a first connector of a support member;
   wherein the second connector is connected to the first connector of the support member to support the at least one elongated side member against the subfloor structure of the inclined shower floor before installation of the inclined shower floor; and
   wherein the support member is height adjustable.

5. The shower installation kit according to claim 1, wherein two of the at least one elongated side member and the elongated drain are positioned in a U shape configuration.

6. The shower installation kit according to claim 1, wherein two of the at least one elongated side member are positioned at opposed sides of the inclined shower floor, and each of the at least one elongated side member have a connecting member; and
   each of the connecting member is connected detachably to each of the at least one elongated side member at an end, the end positioned opposite to the front flange of the elongated drain.

7. The shower installation kit according to claim 1, wherein the at least one elongated side member further includes a vertical mounting flange mounted flat on a vertical side wall with a fastening means and the vertical mounting flange is positioned under a vertically extending wall covering of the vertical side wall.

8. The shower installation kit according to claim 1, wherein the at least one elongated side member further includes a transition face, the transition face extending vertically and defines a wedge-formed transition face between a first surface plane of the inclined shower floor and a second surface plane of the horizontal room floor; and
   the elongated drain further defines a longitudinal drain opening arranged along the front flange of the elongated drain and having a first end and a second end; and the wedge-formed transition face is positioned less than 5 centimeters from an end of the longitudinal drain opening when measured in a longitudinal direction on the elongated drain.

9. The shower installation kit according to claim 8, wherein the longitudinal drain opening is in communication with a corresponding elongated grate, the corresponding elongated grate having a first end and a second end;
the corresponding elongated grate further includes a surrounding frame; and
the transition face abuts or is positioned less than or equal to 7 millimeters from the first and second ends of the corresponding elongated grate.

10. The shower installation kit according to claim 9, wherein the first longitudinal flange of each of the at least one elongated side member has an inner edge facing a center of the inclined shower floor;
the inner edge is positioned between the first and second ends of the corresponding elongated grate; and
the first longitudinal flange has an outer edge facing away from the center of the inclined shower floor and is flush with an end edge of the front flange of the elongated drain.

11. The shower installation kit according to claim 1, wherein the first longitudinal flange has an upwardly open groove extending in a longitudinal direction, and the upwardly open groove has a depth that decreases in a direction towards the elongated drain; and
a U-formed rail having a constant cross-section along its length is inserted into the upwardly open groove for inserting a lower edge of a shower partition wall into the U-formed rail.

12. The shower installation kit according to claim 11, wherein the elongated drain is provided with a back flange positioned opposite to the front flange, and the back flange positioned under a vertically extending wall covering;
the U-formed rail further extending up to abut the back flange of the elongated drain; and
a bottom flange of the U-formed rail further extending above a top surface plane of the front flange of the elongated drain.

13. The shower installation kit according to claim 12, wherein the upwardly open groove is defined by a first wall member and a second wall member, the first and second wall members are opposed,
the first wall member has a first length that stops before reaching a line through a front edge of the front flange of the elongated drain, and the second wall member has a second length that extends up to the back flange of the elongated drain; and
the second wall member is connected by a bend to the raised longitudinal flange, the raised longitudinal flange is positioned under the floor covering of the horizontal room floor.

14. The shower installation kit according to claim 1, wherein the kit includes a longitudinal wall flange having a longitudinal direction and the longitudinal wall flange arranged vertically and positioned under a vertically extending wall covering of a back wall;
the longitudinal wall flange having a U-formed rail mountable along a center line of the longitudinal wall flange to extend through or at least be accessible through the vertically extending wall covering for insertion of an edge of a shower partition wall into the U-formed rail; and a lower end of the longitudinal wall flange having an engagement part fitting a corresponding engagement part of a back flange of the elongated drain.

15. The shower installation kit according to claim 1, wherein the second longitudinal flange defines an inclined shower floor slope in relation to the horizontal room floor.

16. The A-shower installation kit according to claim 1, wherein a transition face of each of the at least one elongated side member abuts or is positioned less than 2 centimeters from a corresponding end of an elongated grate including any surrounding frame associated with the grate.

17. The shower installation kit according to claim 1, wherein a transition face of each of the at least one elongated side member abuts or is positioned less than 3 millimeters from a corresponding end of an elongated grate including any surrounding frame associated with the grate.

18. A method of installing a shower on a sub-floor structure and an inclined shower floor, comprising:
arranging an elongated drain having a longitudinal direction at the inclined shower floor;
mounting the elongated drain at a distance from the subfloor structure of the inclined shower floor before installation of the inclined shower floor;
positioning under floor covering of the inclined shower floor a front flange of the elongated drain;
wherein the elongated drain further includes:
at least one elongated side member having a longitudinal direction arranged at a right to the elongated drain and at a side of the inclined shower floor;
a first longitudinal flange having a defined slope greater than zero, the first longitudinal flange disposed on the at least one elongated side member, and the first longitudinal flange slopes downward towards the elongated drain;
a second longitudinal flange also disposed on the at least one elongated side member, the second longitudinal flange positioned under floor covering of the inclined shower floor and the second longitudinal flange connected to and arranged flush with the front flange of the elongated drain before installation of the inclined shower floor; and
wherein the defined slope of the first longitudinal flange dictates inclination of the shower floor by serving as a guide when a levelling layer is grouted for inclination of the shower floor;
wherein at least one of the at least one elongated side member is provided with a support member adapted to support the at least one elongated side member against the subfloor structure of the inclined shower floor before installation of the inclined shower floor;
the support member is height adjustable; and
the support member is positioned at a distance from the front flange of the elongated drain; and the support member is further positioned at the opposite end of the at least one elongated side member in relation to the front flange of the elongated drain.

19. A method of installing a shower on a sub-floor structure and an inclined shower floor, comprising:
adapting an elongated drain having a longitudinal direction for arrangement at the inclined shower floor sloping towards the elongated drain;
mounting the elongated drain at a distance from the subfloor structure of the inclined shower floor before subsequent making of the inclined shower floor;
positioning a front flange of the elongated drain under floor covering that is covering the inclined shower floor;

extending at least one elongated side member of the elongated drain to extend from the subfloor structure before making the inclined shower floor;

arranging the at least one elongated side member at right angles to the longitudinal direction of the elongated drain;

arranging the at least one elongated side member at a side of the inclined shower floor;

arranging a first longitudinal flange of the at least one elongated side member to define a slope greater than zero of the inclined shower floor in relation to horizontal room floors at least partially surrounding the inclined shower floor and positioning a second longitudinal flange of the at least one elongated side member under floor covering of the inclined shower floor;

connecting the first longitudinal flange with the front flange of the elongated drain;

arranging the first longitudinal flange flush with the front flange of the elongated drain;

wherein the defined slope of the first longitudinal flange dictates inclination of the shower floor by serving as a guide when a levelling layer is grouted for inclination of the shower floor; and wherein at least one of the at least one elongated side member is provided with a support member adapted to support the at least one elongated side member against the subfloor structure of the inclined shower floor before installation of the inclined shower floor;

height adjusting the support member; and positioning the support member at a distance from the front flange of the elongated drain; and further positioning the support member at the opposite end of the at least one elongated side member in relation to the front flange of the elongated drain.

20. The method of installing a shower according to claim 19, fixing to a wall the elongated drain before installation of the inclined shower floor, connecting each one of the at least one elongated side members at a first end to the elongated drain and mounting the at least one elongated side member to the wall or supporting the at least one elongated side member in relation to the subfloor structure of the inclined shower floor at an opposite second end of the at least one elongated side member; and subsequently to mounting the elongated drain and the at least one elongated side members, grouting the inclined shower floor to follow the first longitudinal flange of the at least one elongated side member and then covering the first longitudinal flange with the floor covering.

\* \* \* \* \*